(12) United States Patent
Yamamoto

(10) Patent No.: US 11,385,729 B2
(45) Date of Patent: *Jul. 12, 2022

(54) COMMUNICATION METHOD, COMMUNICATION SYSTEM, SENSOR CONTROLLER, AND STYLUS

(71) Applicant: Wacom Co., Ltd., Saitama (JP)

(72) Inventor: Sadao Yamamoto, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,958

(22) Filed: Jul. 26, 2018

(65) Prior Publication Data
US 2018/0329524 A1 Nov. 15, 2018

Related U.S. Application Data

(63) Continuation of application No. 15/649,215, filed on Jul. 13, 2017, now Pat. No. 10,037,093, which is a
(Continued)

(51) Int. Cl.
*G06F 3/038* (2013.01)
*G06F 3/041* (2006.01)
(Continued)

(52) U.S. Cl.
CPC ............ *G06F 3/0383* (2013.01); *G06F 3/038* (2013.01); *G06F 3/03545* (2013.01);
(Continued)

(58) Field of Classification Search
None
See application file for complete search history.

(56) References Cited

U.S. PATENT DOCUMENTS 8,094,139 B2 1/2012 Bergström et al.
10,037,093 B2 * 7/2018 Yamamoto .............. G06F 3/038
(Continued)

FOREIGN PATENT DOCUMENTS

EP  2 172 834 A2  4/2010
JP  2006-171854 A  6/2006
(Continued)

OTHER PUBLICATIONS

Extended European Search Report, dated Feb. 21, 2018, for European Application No. 15882067,0-1231 / 3258352, 13 pages.
(Continued)

*Primary Examiner* — Benjamin X Casarez
(74) *Attorney, Agent, or Firm* — Seed IP Law Group LLP

(57) ABSTRACT

A sensor controller can be used with both a first stylus that operates in a first communication mode and a second stylus that operates in a second communication mode. The sensor controller performs a dual mode discovery process in which a first discovery process and a second discovery process are alternately performed. During the first discovery process, the sensor controller transmits a search signal for detecting the first stylus. During the second discovery process, the sensor controller performs processing to detect a signal transmitted by the second stylus. When a response to the search signal that is transmitted by the first stylus is detected, an operating mode of the sensor controller is determined to be the first mode. When the signal transmitted by second stylus is detected, the operating mode of the sensor controller is determined to be the second mode.

9 Claims, 25 Drawing Sheets

Related U.S. Application Data continuation of application No. PCT/JP2015/086319, filed on Dec. 25, 2015.

(60) Provisional application No. 62/252,134, filed on Nov. 6, 2015, provisional application No. 62/194,742, filed on Jul. 20, 2015, provisional application No. 62/120,267, filed on Feb. 24, 2015, provisional application No. 62/113,789, filed on Feb. 9, 2015.

(51) Int. Cl.
*G06F 3/0354* (2013.01)
*G06F 3/044* (2006.01)

(52) U.S. Cl.
CPC ............ *G06F 3/041* (2013.01); *G06F 3/0441* (2019.05); *G06F 3/0442* (2019.05); *G06F 3/04162* (2019.05); *G06F 2203/0381* (2013.01); *G06F 2203/0382* (2013.01)

(56) References Cited

U.S. PATENT DOCUMENTS

| | | | |
|---|---|---|---|
| 2006/0012580 A1 | 1/2006 | Perski et al. | |
| 2008/0099254 A1 | 5/2008 | Katsurahira | |
| 2011/0007037 A1 | 1/2011 | Ogawa | |
| 2012/0013555 A1* | 1/2012 | Maeda | G06F 3/03545 345/173 |
| 2012/0050231 A1 | 3/2012 | Westhues et al. | |
| 2012/0105361 A1 | 5/2012 | Kremin et al. | |
| 2013/0076670 A1 | 3/2013 | Wu et al. | |
| 2013/0222238 A1* | 8/2013 | Sliger | G06F 3/0484 345/157 |
| 2014/0028577 A1 | 1/2014 | Krah et al. | |
| 2014/0098033 A1* | 4/2014 | Simmons | G06F 3/03545 345/173 |
| 2014/0160088 A1* | 6/2014 | Mercea | G06F 1/3259 345/179 |
| 2014/0176495 A1* | 6/2014 | Vlasov | G06F 3/03545 345/174 |
| 2014/0240298 A1* | 8/2014 | Stern | G06F 3/0383 345/179 |
| 2015/0002425 A1* | 1/2015 | Lee | G06F 3/046 345/173 |
| 2015/0153845 A1* | 6/2015 | Chang | G06F 3/0441 345/179 |
| 2015/0309599 A1* | 10/2015 | Michihata | G06F 3/03545 345/174 |
| 2015/0363012 A1* | 12/2015 | Sundara-Rajan | G06F 3/038 345/179 |
| 2016/0048234 A1* | 2/2016 | Chandran | G06F 3/0383 345/174 |
| 2016/0070372 A1* | 3/2016 | Hamaguchi | G06F 3/041 345/179 |
| 2016/0117047 A1* | 4/2016 | Dinu | G06F 3/0442 345/174 |
| 2016/0209944 A1* | 7/2016 | Shim | G06F 3/03545 |
| 2016/0239123 A1* | 8/2016 | Ye | G06F 3/0416 |
| 2016/0246390 A1* | 8/2016 | Lukanc | G06F 3/0383 |
| 2016/0320918 A1 | 11/2016 | Hara | |
| 2017/0131798 A1* | 5/2017 | Geaghan | G06F 3/03545 |
| 2018/0120961 A1* | 5/2018 | Liang | G06F 3/0412 |

FOREIGN PATENT DOCUMENTS

| | | |
|---|---|---|
| JP | 2006-309333 A | 11/2006 |
| JP | 2007-183809 A | 7/2007 |
| JP | 2008-507026 A | 3/2008 |
| JP | 2008-112415 A | 5/2008 |
| JP | 2008-532139 A | 8/2008 |
| JP | 2011-18090 A | 1/2011 |
| JP | 2013-69270 A | 4/2013 |
| JP | 2013-536967 A | 9/2013 |
| JP | 2013-536968 A | 9/2013 |
| TW | 201447656 A | 12/2014 |
| WO | 2014/174960 A1 | 10/2014 |
| WO | 2014/185523 A1 | 11/2014 |
| WO | 2015/111159 A1 | 7/2015 |

OTHER PUBLICATIONS

Japanese Office Action dated Jan. 31, 2017, for JP Application No. 2016-238145, 3 pages.
Extended European Search Report, dated Jun. 19, 2019, for European Application No. 19169809.1-1231, 13 pages.
Japanese Office Action, dated Jun. 29, 2021, for Japanese Application No. 2020-127453, 4 pages.

* cited by examiner

| SENSOR CONTROLLER 300 / STYLUS 100 | FIRST SENSOR CONTROLLER 310 (STD) | SECOND SENSOR CONTROLLER 320 (PRP) | DUAL MODE CONTROLLER 330 (STD+PRP) |
|---|---|---|---|
| FIRST STYLUS 110 (STD) | E11 FIRST MODE (STD) | E12 NOT DISCOVERED | E13 FIRST MODE (STD) |
| SECOND STYLUS 120 (PRP) | E21 NOT DISCOVERED | E22 SECOND MODE (PRP) | E23 SECOND MODE (PRP) |
| DUAL MODE STYLUS 130 (STD+PRP) | E31 FIRST MODE (STD) | E32 SECOND MODE (PRP) | E33 |

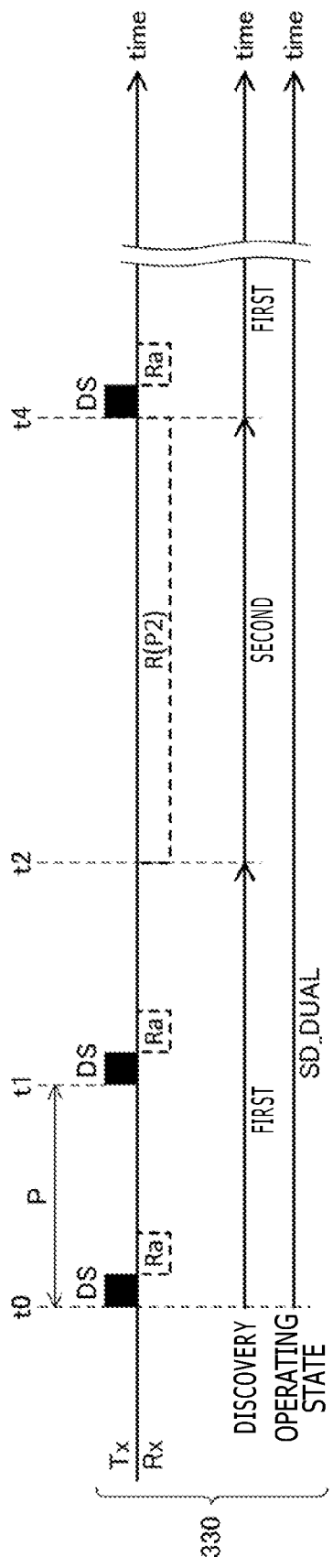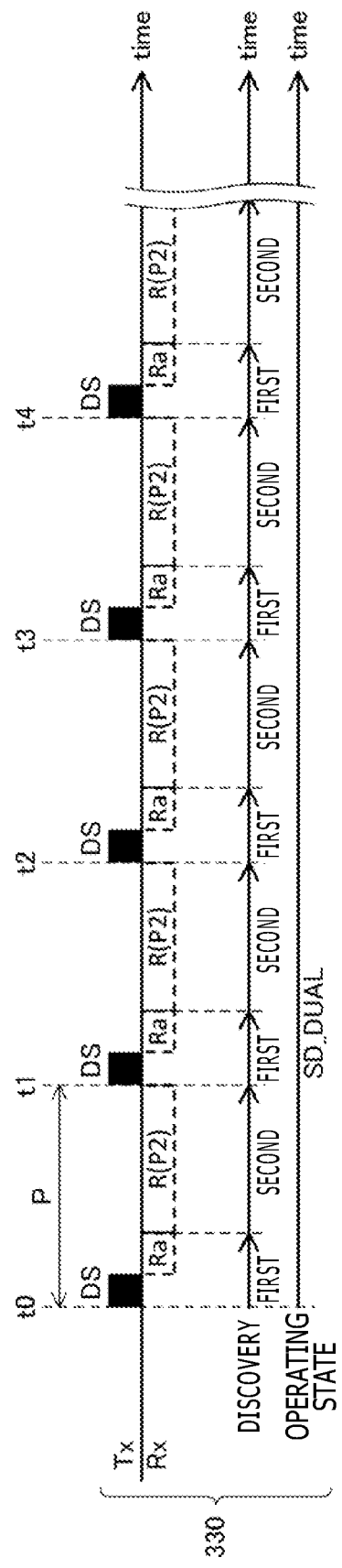

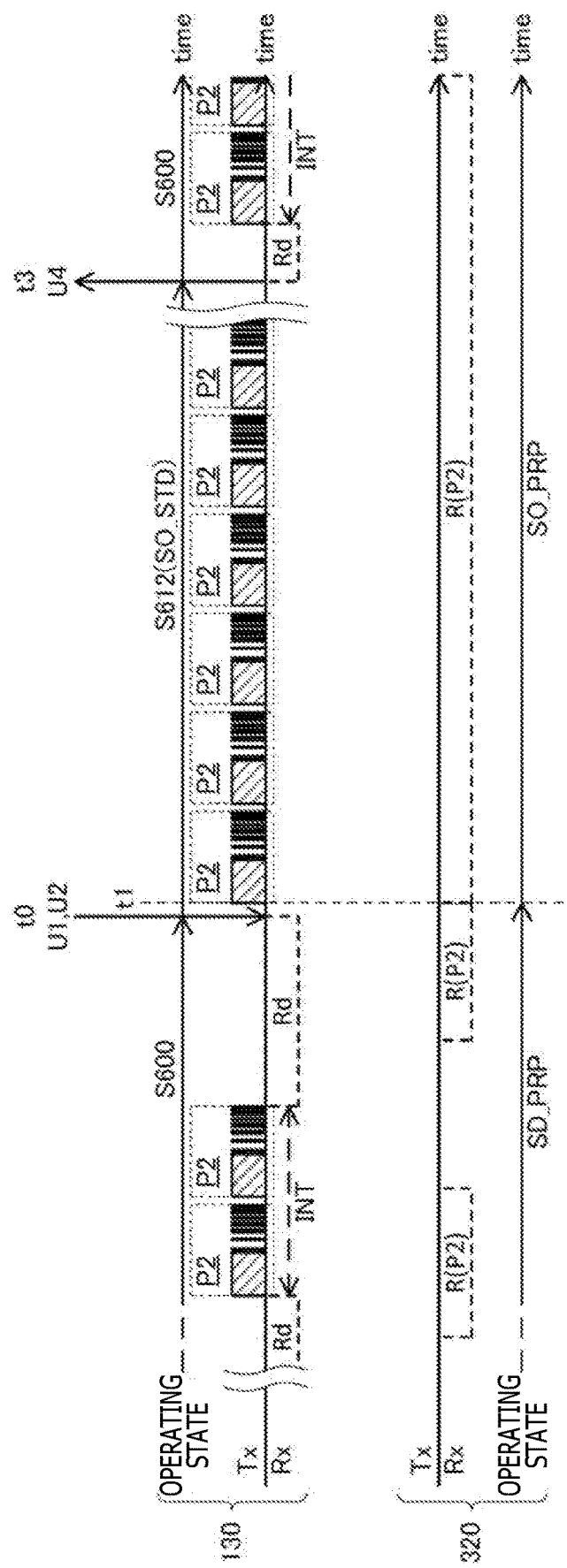

FIG.11

| | | SENSOR CONTROLLER 300 | | | | | |
|---|---|---|---|---|---|---|---|
| | | FIRST SENSOR CONTROLLER 310 | SECOND SENSOR CONTROLLER 320 | | DUAL MODE CONTROLLER 330 | | |
| | | FIRST COMMUNICATION CIRCUIT 311 | SECOND COMMUNICATION CIRCUIT 321 | SECOND COMMUNICATION CIRCUIT 322 | FIRST COMMUNICATION CIRCUIT 311 / SECOND COMMUNICATION CIRCUIT 321 | FIRST COMMUNICATION CIRCUIT 311 / SECOND COMMUNICATION CIRCUIT 322 |
| STYLUS 100 | FIRST STYLUS 110 | FIRST COMMUNICATION CIRCUIT 111 | E11 FIRST COMMUNICATION METHOD | E12 × | E13 × | E14 FIRST COMMUNICATION METHOD | E15 FIRST COMMUNICATION METHOD |
| | SECOND STYLUS 120 | SECOND COMMUNICATION CIRCUIT 121 | E21 × | E22 2-1ST COMMUNICATION METHOD | E23 × | E24 2-1ST COMMUNICATION METHOD | E25 × |
| | | SECOND COMMUNICATION CIRCUIT 122 | E31 × | E32 × | E33 2-2ND COMMUNICATION METHOD | E34 × | E35 2-2ND COMMUNICATION METHOD |
| | DUAL MODE STYLUS 130 | FIRST COMMUNICATION CIRCUIT 111 / SECOND COMMUNICATION CIRCUIT 121 | E41 FIRST COMMUNICATION METHOD | E42 2-1ST COMMUNICATION METHOD | E43 × | E44 2-1ST COMMUNICATION METHOD OR FIRST COMMUNICATION METHOD | E45 FIRST COMMUNICATION METHOD |
| | | FIRST COMMUNICATION CIRCUIT 111 / SECOND COMMUNICATION CIRCUIT 122 | E51 FIRST COMMUNICATION METHOD | E52 × | E53 2-2ND COMMUNICATION METHOD | E54 FIRST COMMUNICATION METHOD | E55 2-2ND COMMUNICATION METHOD OR FIRST COMMUNICATION METHOD |

FIG. 13

| | | SENSOR CONTROLLER 300 | | | | |
|---|---|---|---|---|---|---|
| | | FIRST SENSOR CONTROLLER 310 | SECOND SENSOR CONTROLLER 320 | | DUAL MODE CONTROLLER 330 | |
| | | FIRST COMMUNICATION CIRCUIT 311 | SECOND COMMUNICATION CIRCUIT 321 | SECOND COMMUNICATION CIRCUIT 322 | FIRST COMMUNICATION CIRCUIT 311 SECOND COMMUNICATION CIRCUIT 321 | FIRST COMMUNICATION CIRCUIT 311 SECOND COMMUNICATION CIRCUIT 322 |
| FIRST STYLUS 110 | FIRST COMMUNICATION CIRCUIT 111 | E11 FIRST COMMUNICATION METHOD | E12 × | E13 × | E14 FIRST COMMUNICATION METHOD | E15 FIRST COMMUNICATION METHOD |
| SECOND STYLUS 120 | SECOND COMMUNICATION CIRCUIT 121 | E21 × | E22 2-1ST COMMUNICATION METHOD | E23 × | E24 2-1ST COMMUNICATION METHOD | E25 × |
| | SECOND COMMUNICATION CIRCUIT 122 | E31 × | E32 × | E33 2-2ND COMMUNICATION METHOD | E34 × | E35 2-2ND COMMUNICATION METHOD |
| DUAL MODE STYLUS 130 | FIRST COMMUNICATION CIRCUIT 111 SECOND COMMUNICATION CIRCUIT 121 | E41 FIRST COMMUNICATION METHOD | E42 2-1ST COMMUNICATION METHOD | E43 × | E44B EXPANSION MODE OR FIRST COMMUNICATION METHOD | E45 FIRST COMMUNICATION METHOD |
| | FIRST COMMUNICATION CIRCUIT 111 SECOND COMMUNICATION CIRCUIT 122 | E51 FIRST COMMUNICATION METHOD | E52 × | E53 2-2ND COMMUNICATION METHOD | E54 FIRST COMMUNICATION METHOD | E55B EXPANSION MODE OR FIRST COMMUNICATION METHOD |

COMMUNICATION METHOD, COMMUNICATION SYSTEM, SENSOR CONTROLLER, AND STYLUS

BACKGROUND

Technical Field

The present disclosure relates to a communication method performed by a stylus and a sensor controller, a communication system, a sensor controller, and a stylus, and particularly to a communication method that makes it possible to select an operating mode of a stylus and a sensor controller in response to a type of the stylus and a type of the sensor controller, a communication system, a sensor controller, and a stylus.

Description of Related Art

In recent years, various types of styluses have become available as a tool for hand-written inputting on an electronic apparatus. Especially, an active capacitive stylus is a stylus that includes a power supply circuit and a signal processing circuit, and supplies charge in response to a transmission signal to an electrode provided in the proximity of a tip end of the stylus to cause a variation of an electric field in a space in the proximity of an indication of a position thereby to transmit a predetermined signal. An example of an active capacitive stylus is disclosed in Patent Document 1.

A sensor controller is provided at the electronic apparatus side. A sensor controller of the type described utilizes electrodes disposed in a matrix, and is configured such that it detects a variation of the charge amount induced in the electrode group in the proximity of an indication of a position in response to a variation of the electric field to detect a signal transmitted from the stylus and derives the position of the stylus based on the position of an electrode by which the signal is detected and the level of the signal or the like.

The active capacitive stylus and the sensor controller configure one set of a communication system in that transmission and reception of a signal and information are performed, and are utilized in an operating mode that complies with one communication protocol for which the communication system is ready.

PRIOR ART DOCUMENT PATENT DOCUMENT

Patent Document 1: PCT Patent Publication No. WO2015/111159

BRIEF SUMMARY

Technical Problems

Usually, the sensor controller complies only with one communication method and cannot detect a stylus that complies with a different communication method or an expanded method from various differences such as a difference in utilized frequency, signal format, or communication direction (one direction or two directions).

If the communication standards between a stylus and a sensor controller are unified to one standard, then there is no problem even if a sensor controller that complies only with one communication method is used as described above. However, such a standard as just described does not actually exist at least at the present point of time. Alternatively, even if such a standard as just described is satisfied in the future, until a stylus that supports the standard (hereinafter referred to as "first communication method STD") becomes popular, a stylus that complies with a second communication method PRP having some function unique to a vendor is used in parallel.

Further, even if the first communication method STD is satisfied, if the first communication method STD does not have backward compatibility and does not permit utilization of a stylus that complies with the second communication method PRP, then the stylus and functions of the stylus that comply with the second communication method PRP owned by the user before the first communication method STD is satisfied cannot be utilized by the latest electronic apparatus.

Further, as viewed from the sensor controller at the electronic apparatus side, it is not easy to decide in advance with which standard a stylus to be utilized on a sensor of the electronic apparatus from now on complies. In particular, the reaching distance of a signal transmitted and received utilizing capacitive coupling between the active capacitive stylus and the sensor controller at present is so short as several millimeters or several tens millimeters in comparison with the reaching distance of a general wireless communication apparatus. Therefore, different from an inputting device that performs wireless communication utilizing an electromagnetic wave capable of implementing communication in a unit of several meters such as BLUETOOTH® (registered trademark) wireless technology standard, it is difficult for the sensor controller to grasp which type of a stylus is utilized before the user actually uses a pen on an operation face.

Similarly, even if a stylus ready for a plurality of communication methods is included in active capacitive styluses, it is difficult for the stylus to grasp in advance for which communication method a sensor controller of an electronic apparatus is ready. If the stylus searches for a communication method or an operating mode for which the sensor controller is ready after a pen touch operation is performed actually for the electronic apparatus, then there is the possibility that signal transmission of the stylus may miss, and this will cause missing in a detection process or the like of an indication position by the stylus at the sensor controller side.

Accordingly, a method is desired which, in an active capacitive type stylus and a sensor controller that perform communication utilizing capacitive coupling, is adapted to a typical utilization mode of a stylus in which approaching and spacing are repeated every time a stroke is drawn, and makes it possible to detect communication methods for which the stylus and the sensor controller are ready in a timely manner and besides allows the stylus and the sensor controller to start operating in a mode ready for a communication method with which the stylus and the sensor controller are ready.

Technical Solution

A communication method according to a first aspect of the present disclosure is performed in a system including a first stylus that operates in a first mode in which bidirectional communication is performed or a second stylus that operates in a second mode in which bidirectional communication or unidirectional communication is performed, and a dual mode controller connected to a sensor that capacitively couples to the first stylus or the second stylus, wherein communication between the first stylus or the second stylus and the dual mode controller is performed by changing an electric field between the first stylus or the second stylus and the sensor. The communication method includes the dual mode controller performing a dual mode discovery process in which a first discovery process and a second discovery process are alternately performed. During the first discovery process, the controller transmits a search signal for detecting the first stylus, and performs processing to detect a response signal transmitted by the first stylus in response to the search signal. During the second discovery the controller performs processing to detect a signal transmitted by the second stylus. When the first stylus is detected by detecting the response signal transmitted by the first stylus in response to the search signal, operating the dual mode controller determines that a mode of the dual mode controller is the first mode. When the second stylus is detected by detecting the signal transmitted from the second stylus within a period during which the second discovery process is performed, the dual mode controller determines that the operating mode of the dual mode controller is the second mode. The dual mode controller of receiving a signal transmitted from one of the first stylus and the second stylus operating by operating the dual mode controller in the determined mode.

According to a second aspect of the present disclosure, when the dual mode controller determines that the operating mode of the dual mode controller is the first mode, after the response signal transmitted by the first stylus is detected, the dual mode controller repetitively performs only the first discovery over a fixed period of time.

A communication method according to a third aspect of the present disclosure is a communication method in a system including a dual mode stylus that operates in both a first mode in which bidirectional communication is performed and a second mode different from the first mode, and a first sensor controller that operates in the first mode or a second sensor controller that operates in the second mode. The communication method includes the dual mode stylus performing a dual mode detection process in which a first detection process and a second detection process are alternately performed. During the first detection process, the stylus performs processing to detect a search signal transmitted by the first sensor controller. During the second detection process, the stylus transmits a pen signal to the second sensor controller. In response to the stylus detecting the search signal, the stylus stops transmitting the pen signal and an operating mode of the dual mode stylus is the first mode. It is to be noted that, in the communication method according to the present third aspect, the dual mode stylus may further stop, when a pen-down operation or a pen touch operation is detected at the discovery step, performing the first discovery process and continuously perform the second discovery process.

A communication method according to a fourth aspect of the present disclosure is a communication method in a system including a dual mode stylus that operates in a first mode in which bidirectional communication is performed and a second mode a function is performed, and a dual mode controller that is connected to a sensor capacitively coupled to the dual mode stylus and that operates in both the first mode and the second mode. The communication method includes the dual mode controller performing a dual mode discovery process that includes a first discovery process and a second discovery process. During the first discovery process the dual mode controller transmits a search signal for detecting the first stylus and performs processing to detect a response signal transmitted by the first stylus in response to the search signal. During the second discovery process the dual mode controller performs processing to detect a signal transmitted by the second stylus. When the dual mode controller detects the first stylus by detecting the response signal transmitted by the dual mode stylus in response to the search signal, the dual mode controller determines the function performed during the second mode based on information transmitted from the dual mode stylus, and decides whether the function performed in the second mode conforms to a function of the dual mode controller and determines whether an operating mode of the dual mode controller is the first mode or the second mode based on a result of the deciding.

A sensor controller according to a fifth aspect of the present disclosure is a dual mode controller connected to a sensor capacitively coupled to a first stylus that operates in a first mode in which bidirectional communication is performed or a second stylus that operates in a second mode in which bidirectional communication or unidirectional communication is performed, wherein the sensor controller communicates with the first stylus or the second stylus by changing an electric field between the first stylus or the second stylus and the sensor. The sensor controller performs a dual mode discovery process that includes a first discovery process and a second discovery process. During the first discovery process, the sensor controller transmits a search signal for detecting the first stylus and performs processing to detect a response signal transmitted by the first stylus in response to the search signal. During the second discovery process, the sensor controller performs processing to detect a signal transmitted from the second stylus. When the first stylus is detected by detecting a response signal transmitted by the first stylus in response to the search signal, the sensor controller determines that an operating mode of the sensor controller is the first mode. When the second stylus is detected by detecting a signal transmitted from the second stylus within a period in which the second discovery is performed, the sensor controller determines that the operating mode of the sensor controller is the second mode. The sensor controller receives a signal transmitted from one of the first stylus and the second stylus operating by operating the sensor controller in the determined mode.

According to a sixth aspect of the present disclosure, a stylus operates in both a first mode in which bidirectional communication is performed and a second mode different from the first mode, and a dual mode stylus communicates with a first sensor controller that operates in the first mode and a second sensor controller that operates in the second mode. The stylus performs dual mode detection process in which a first detection process and a second detection are alternately performed. During the first detection process, the stylus performs processing to detect a search signal transmitted from the first sensor controller. During the second detection process, the stylus transmits a pen signal for the second sensor controller. When the search signal is detected, the stylus stops transmitting the pen signal and an operating mode of the stylus is the first mode.

Advantageous Effects

With the disclosure described above, in the stylus and the sensor controller that perform communication utilizing capacitive coupling, for example, at a point of time at which the stylus enters a sensing range when a pen-down operation or a pen touch operation is performed, the stylus and sensor controller can detect the communication methods with which they individually comply and besides each of the stylus and the sensor controller can start operating in a mode that complies with the communication method or the expansion function of each other.

Especially, with the first and fifth aspects of the present disclosure, the dual mode controller that operates in both the first mode and the second mode can be caused to operate in the first mode when the dual mode controller is used together with a first stylus that operates in the first mode, and can be caused to operate in the second mode when the dual mode controller is used together with a second stylus that operates the second mode. Accordingly, both of the first and second styluses can be used suitably together the dual mode controller.

With the second aspect of the present disclosure, after the operating mode of the dual mode controller is determined to be the first mode (or the second mode) once, since only the discovery process specialized for the first mode (or the second mode) is performed, as long as the user continues to utilize the same type of stylus, the stylus can be detected in a short response time period in comparison with that in an alternative case in which a plurality of discoveries are performed alternately.

With the third and sixth aspects of the present disclosure, the dual mode stylus operates in both the first mode and the second mode, and the operating mode of the dual mode stylus, in an initial state, the first detection process in which the stylus detects the search signal transmitted from the first sensor controller that operates in the first mode and the second detection process in which the stylus transmits the pen signal to the second sensor controller that operates in the second mode are repeated alternately can be switched, when the dual mode stylus comes close to the first sensor controller, to operate in operating the first mode. Further, when a pen-down operation or a pen touch operation is detected, the first detection process in which the stylus detects the search signal can be stopped and the second detection process in which the stylus transmits the pen signal can be performed continuously. Accordingly, the dual mode stylus can be implemented which can be used, in a utilization environment in which both the first sensor controller that operates in the first mode in which bidirectional communication is performed and the second sensor controller that operates in the second mode (particularly, ready only for reception of a pen signal) exist in a mixed manner, appropriate operating with whichever one of the sensor controllers the dual mode stylus is used.

With the fourth aspect of the present disclosure, the dual mode controller can determine that the operating mode of the dual mode controller is the first mode or the second mode (expansion mode) in response to whether the function the dual mode stylus has conforms with the function of the dual controller. Consequently, for example, where the stylus has a function for transmitting expansion information such as tilt information that is not supported in the first mode in which information of a writing pressure or the like is transmitted, the dual mode controller can make preparations for reception of the expansion information and implement a mode change synchronized with the dual stylus such as to issue a command for causing the dual mode stylus to transmit the expansion information.

BRIEF DESCRIPTION OF THE DRAWINGS

FIG. 7Ca is a view illustrating an example of a dual mode discovery and FIG. 7Cb is a view illustrating another example of the dual mode discovery, according to one or more embodiments of the present disclosure.

FIG. 8D is a view illustrating operation of the communication system 1 corresponding to a field E32 depicted in FIG. 4, according to one or more embodiments of the present disclosure.

FIG. 11 is a table illustrating communication methods between styluses 100 and sensor controllers 300 determined by a discovery and a mode determination process, according to one or more embodiments of the present disclosure.

FIG. 13 is a table of communication methods between styluses 100 and sensor controllers 300 determined by a discovery and a mode determination process depicted in FIG. 12 or 12B, according to one or more embodiments of the present disclosure.

DETAILED DESCRIPTION

First Embodiment

Figure 1:
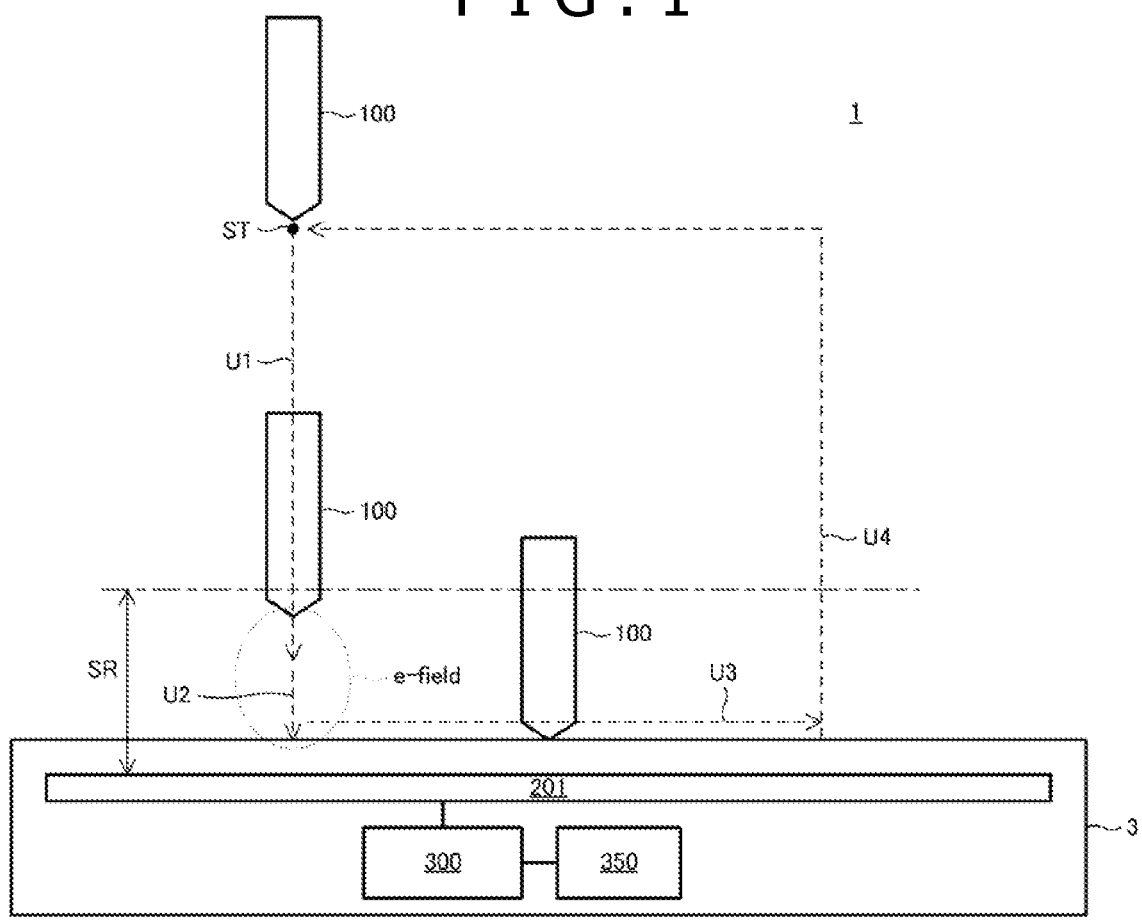
FIG. 1 illustrates a form of using a communication system 1, according to one or more embodiments of the present disclosure.

FIG. 1 is an overview figure illustrating a utilization form of a communication system 1 according to a first embodiment of the present disclosure. The communication system 1 is configured from a stylus 100 and a sensor controller 300 connected to a sensor 201 provided in an electronic apparatus 3 (device). The stylus 100 and the sensor 201 are coupled by capacitive coupling, and the sensor controller 300 is configured such that it varies an electric field (electric field e-field illustrated in FIG. 1) between the stylus 100 and the sensor 201 capacitively coupled to each other thereby to perform communication with the stylus 100. Various signals exchanged between the stylus 100 and the sensor controller 300 such as a search signal DS, a response signal ACK, a first pen signal P1, and a second pen signal P2 hereinafter described are exchanged in an associated relationship with the variation of the electric field. Further, the sensor controller 300 is connected to a host processor 350 that controls the electronic apparatus 3. As an example of the electronic apparatus 3, a device including a tablet computer or a digitizer is available.

User operations U1 to U4 indicated by broken lines with arrow marks in FIG. 1 indicate typical operations of a user who utilizes the stylus 100.

In an initial state, the stylus 100 is placed outside a sensing range SR that is a range in which the sensor controller 300 and the stylus 100 can detect each other from signals transmitted from each other. If the user starts utilization of the stylus 100, then the stylus 100 is moved to a position indicated by a start position ST. In this initial state, the state of the sensor controller 300 and the stylus 100 is in a discovery state SD depicted in FIG. 2.

If the stylus 100 enters the inside of the sensing range SR of the sensor controller 300 by a pen-down operation U1, then the sensor controller 300 and the stylus 100 can detect signals transmitted by each other through capacitive coupling between the sensor 201 and the stylus 100. By detecting the transmission signals of each other, the sensor controller 300 and the stylus 100 can start communication through a pairing process or the like, and as a result, transition to an operation state SO (IN201 of FIG. 2).

Thereafter, the tip end of the stylus 100 is brought into contact with the operation face by a pen touch operation U2 and slidably moves so as to draw a locus according to contents of hand-writing on the operation face of the electronic apparatus 3 by a sliding operation U3. While the sliding operation U3 is being performed, the stylus 100 successively detects a varying writing pressure and continues to send out a signal including data of the writing pressure and so forth (a first pen signal P1 illustrated in FIG. 5A hereinafter described or a second pen signal P2 illustrated in FIG. 6A hereinafter described) to the sensor controller 300.

Finally, by a pen-up operation U4, the stylus 100 is retracted to the outside of the sensing range SR again. If a time period within which the sensor controller 300 and the stylus 100 cannot detect each other continues for a fixed period of time, for example, for several seconds (IN203 of FIG. 2), then the states of the sensor controller 300 and the stylus 100 individually return from the operation state SO to the discovery state SD.

Figure 2:
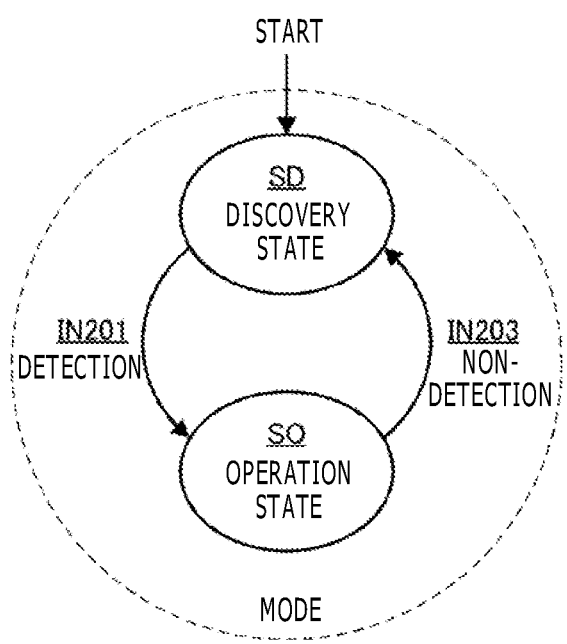
FIG. 2 is a state transition diagram of a sensor controller 300 and a stylus 100, according to one or more embodiments of the present disclosure.

FIG. 2 is a state transition diagram of the sensor controller 300 and the stylus 100 in a certain operating mode. The operating mode is one form of an operating that depends upon a protocol between the sensor controller 300 and the stylus 100, a data format, presence or absence of utilization of an expansion function and so forth. For example, a first mode (FIGS. 5Ca and 5Cb) that complies with a first communication method, a second mode (FIGS. 6Ca and 6Cb) that complies with a second communication method and so forth are available.

When the sensor controller 300 and the stylus 100 act in a certain operating mode, each of the states of the sensor controller 300 and the stylus 100 is caused to transition between the discovery state SD and the operation state SO in the operating mode currently utilized.

The discovery state SD is a state in which the sensor controller 300 and the stylus 100 perform a discovery process for detecting each other. If the pen-down operation U1 or the like is performed in the discovery state SD, then the sensor controller 300 detects the stylus 100 while the stylus 100 detects the sensor controller 300, and both the sensor controller 300 and the stylus 100 transition to the operation state SO using the mutual detection as a trigger (IN201).

In the operation state SO, a signal (a first pen signal P1 illustrated in FIG. 5A hereinafter described or a second pen signal P2 illustrated in FIG. 6A hereinafter described) is transmitted from the stylus 100, and detection of the signal is performed by the sensor controller 300. If the sensor controller 300 (or the stylus 100) no longer detects the stylus 100 (or the sensor controller 300), then the sensor controller 300 and the stylus 100 transition to the discovery state SD again (IN203).

In this manner, in one certain mode or one certain operating mode, the discovery and the operation state (communication process of a signal based on the operating mode) are repeated. If transition from the discovery state to the operation state or transition from the operation state to the discovery state is performed, then a case may exist in which transition to the operation state is performed through a pairing state or the like, or transition through a suspend state or the like may intervene when transition from the operation state to the discovery state is performed.

As hereinafter described with reference to FIG. 7, the communication method, the communication system, the sensor controller, and the stylus according to the present disclosure have a common characteristic in that a discovery (a dual mode discovery, a state SD_DUAL of FIGS. 7B and 10) process hereinafter described is further performed separately from a discovery prepared only for one operating mode.

Figure 3:
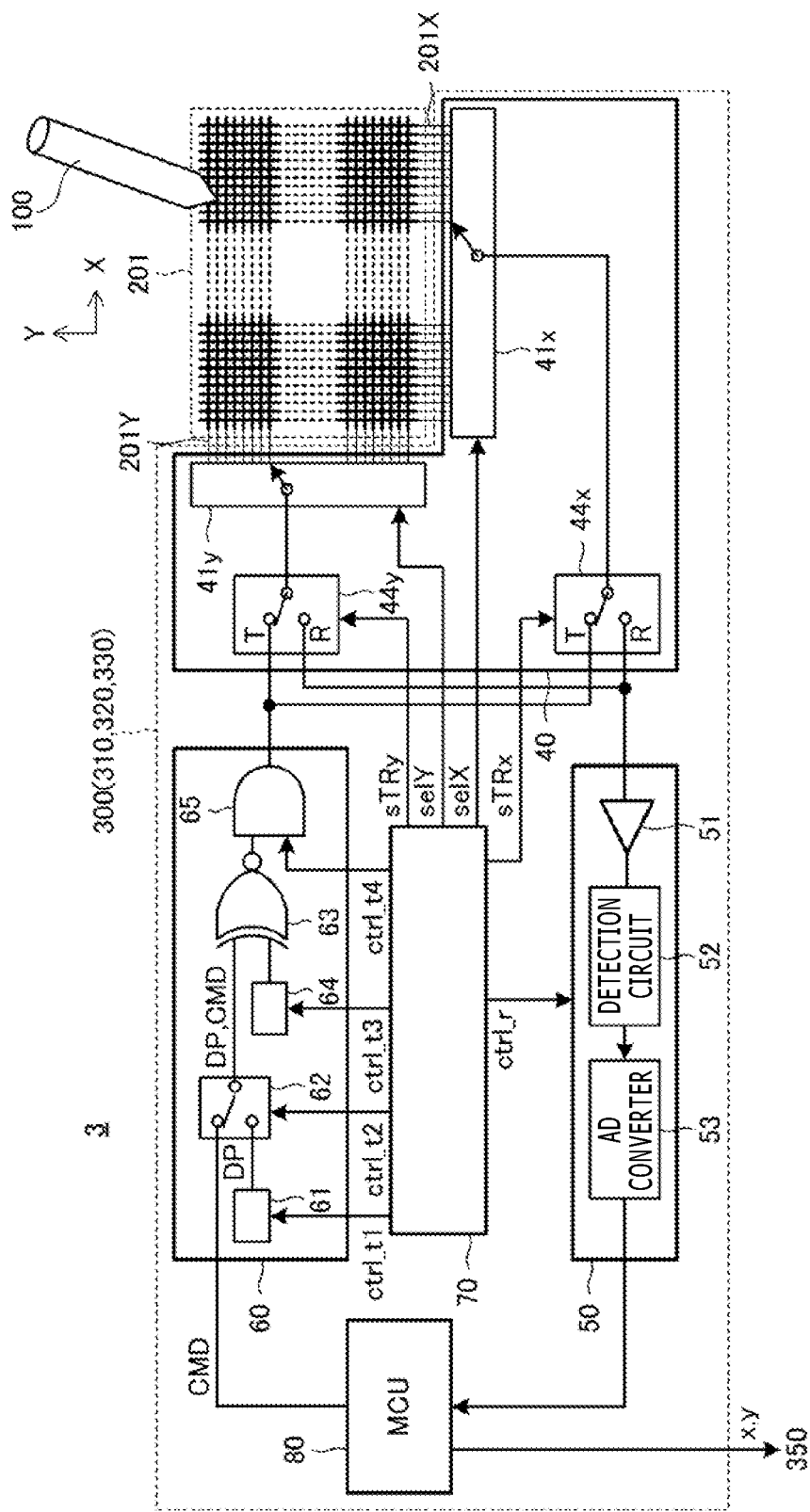
FIG. 3 is a view depicting an example of a configuration of the sensor controller 300 and a sensor 201, according to one or more embodiments of the present disclosure.

FIG. 3 is a view depicting a particular configuration of the sensor controller 300 and the sensor 201. As depicted in FIG. 3, the sensor 201 has a configuration that a plurality of linear electrodes 201X and another plurality of linear electrodes 201Y are disposed in a matrix on the operation face, and is capacitively coupled to the stylus 100 by the linear electrodes 201X and 201Y. Further, the sensor controller 300 is configured including a transmission circuit 60, a selection circuit 40, a reception circuit 50, a logic circuit 70, and control circuit, for example, a micro controller unit (MCU) 80.

The transmission circuit 60 transmits a predetermined control signal to the stylus 100. In particular, the transmission circuit 60 is configured including a search signal supply circuit 61, a switch 62, a direct spread circuit 63, a spread code retention circuit 64, and a transmission guard circuit 65.

The search signal supply circuit 61 retains a search pattern DP and repetitively outputs a search signal DS in a cycle (=a period P illustrated in FIG. 7Ca and 7Cb or the like hereinafter described) in accordance with an instruction of a control signal ctrl_t1 supplied from the logic circuit 70. The search signal DS is used in order to allow the stylus 100 to detect the presence of the sensor controller 300 and includes a known bit pattern at the stylus side.

The switch 62 selects one of the search signal supply circuit 61 and the MCU 80 on the basis of a control signal ctrl_t2 supplied from the logic circuit 70 and supplies an output of the selected one of the search signal supply circuit 61 and the MCU 80 to the direct spread circuit 63. If the switch 62 selects the search signal supply circuit 61, then the search pattern DP described above is supplied to the direct spread circuit 63. On the other hand, if the switch 62 selects the MCU 80, then a control command CMD is supplied to the direct spread circuit 63. The control command CMD is information that configures a command for controlling the detected stylus 100 or a stylus 100 that is to be detected later or the like.

The spread code retention circuit 64 generates a spread code PN on the basis of a control signal ctrl_t3 supplied from the logic circuit 70. The spread code PN generated by the spread code retention circuit 64 is supplied to the direct spread circuit 63.

The direct spread circuit 63 individually multiplies (XOR) a plurality of bits configuring a signal supplied from the switch 62 by a spread code PN supplied from the spread code retention circuit 64. When the search pattern DP is supplied from the switch 62, a signal to be outputted from the direct spread circuit 63 becomes the search signal DS.

On the other hand, when the control command CMD is supplied from the switch 62, the signal to be outputted from the direct spread circuit 63 is a search signal DS (control signal C1_U) that is a search signal DS that includes the control command CMD.

The transmission guard circuit 65 inserts a guard period between a transmission period of each of the first and second control signals outputted from the direct spread circuit 63 and a reception period within which a signal from the stylus 100 is to be received on the basis of a control signal ctrl_t4 supplied from the logic circuit 70.

The selection circuit 40 is a switch that switches between a transmission period within which a signal is transmitted from the sensor 201 and a reception period within which a signal is received by the sensor 201 on the basis of the control of the logic circuit 70. In particular, the selection circuit 40 is configured including switches 44x and 44y and conductor selection circuits 41x and 41y. The switch 44x operates on the basis of a control signal sTRx supplied from the logic circuit 70 such that, within the transmission period, an output terminal of the transmission circuit 60 is connected to an input terminal of the conductor selection circuit 41x, and within the reception period, an output terminal of the conductor selection circuit 41x is coupled to an input terminal of the reception circuit 50. The switch 44y operates on the basis of a control signal sTRy supplied from the logic circuit 70 such that, within the transmission period, an output terminal of the transmission circuit 60 is connected to an input terminal of the conductor selection circuit 41y and, within the reception period, an output terminal of the conductor selection circuit 41y is connected to an input terminal of the reception circuit 50. The conductor selection circuit 41x operates on the basis of a control signal selX supplied from the logic circuit 70 such that one of the plurality of linear electrodes 201X is selected and the selected one of the linear electrodes 201X is connected to the switch 44x. The conductor selection circuit 41y operates on the basis of a control signal selY supplied from the logic circuit 70 such that one of the plurality of linear electrodes 201Y is selected and the selected one of the linear electrodes 201Y is coupled to the switch 44y.

The reception circuit 50 detects or receives a signal transmitted from the stylus 100 (a position signal Pos illustrated in FIG. 7E hereinafter described, a first pen signal P1 illustrated in FIGS. 5A and 9A hereinafter described, or a second pen signal P2 illustrated in FIGS. 6A and 9B hereinafter described) on the basis of a control signal ctrl_r of the logic circuit 70. In particular, the reception circuit 50 is configured including an amplification circuit 51, a detection circuit 52, and an analog/digital (AD) converter 53.

The amplification circuit 51 amplifies and outputs a reception signal supplied from the selection circuit 40. The wave detection circuit 52 generates a voltage corresponding to the level of the output signal of the amplification circuit 51. The AD converter 53 samples the voltage outputted from a detection circuit 49 at predetermined intervals of time and generates a digital signal. The digital data outputted from the AD converter 53 is supplied to the MCU 80.

The MCU 80 is a microprocessor that has a read-only memory (ROM) and a random access memory (RAM) not depicted in the inside thereof and operates on the basis of a predetermined program. The logic circuit 70 outputs the various control signals described above under the control of the MCU 80. Further, the MCU 80 plays a roll of deriving coordinate data x, y and so forth indicative of a position of the stylus 100 on the basis of the digital data supplied from the AD converter 53 and outputting the derived data to the host processor 350.

By the configuration described above, the sensor controller 300 transmits a control signal (search signal DS) through the sensor 201 utilizing the function of the transmission circuit 60 and detects or receives signals such as a response signal ACK, a first pen signal P1, or a second pen signal P2 transmitted from the stylus 100 utilizing the function of the reception circuit 50 and thereby performs the functions of a first communication circuit 311 and second communication circuits 321 and 322 hereinafter described. Further, the MCU 80 performs processes of a first discovery process, a second discovery process, and a dual mode discovery by transmitting or receiving signals utilizing the functions of the transmission circuit 60 and the reception circuit 50.

Figures 4, 5A:
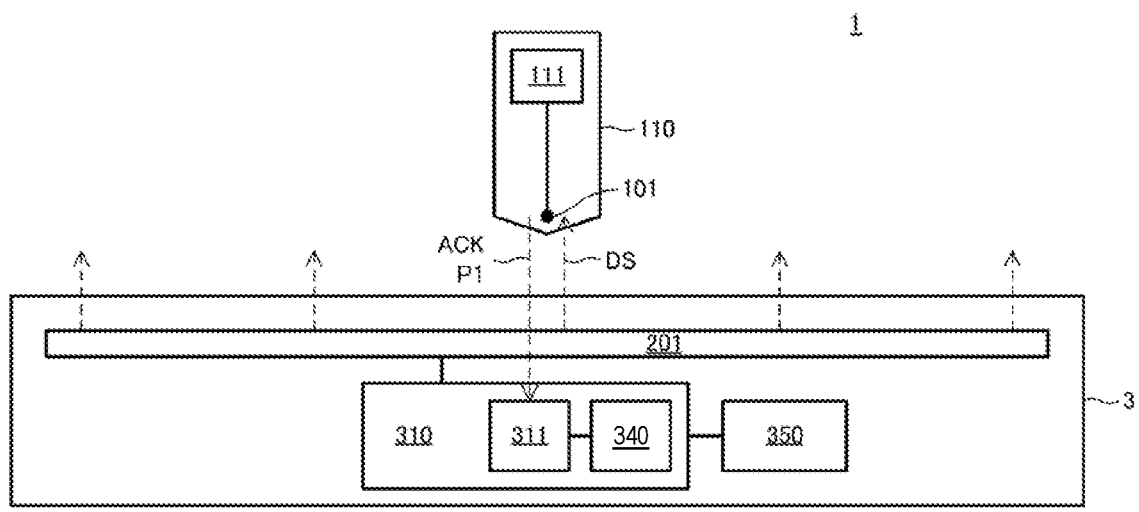
FIG. 4 is a view depicting types of the stylus 100 and the sensor controller 300 and corresponding operating modes, according to one or more embodiments of the present disclosure.
FIG. 5A is an overview figure of the communication system 1 corresponding to a field E11 of FIG. 4, according to one or more embodiments of the present disclosure.

FIG. 4 is a view illustrating operating modes of the stylus 100 and the sensor controller 300 determined by the types of the stylus 100 and the sensor controller 300 and communication methods according to the present embodiment.

As depicted in FIG. 4, as the stylus 100, three types are available including a first stylus 110 that performs only a first communication method STD, a second stylus 120 that performs only a second communication method PRP, and a dual mode stylus 130 that performs both the first communication method STD and the second communication method PRP. Similarly, as the sensor controller 300, three types are available including a first sensor controller 310 that performs only the first communication method STD, a second sensor controller 320 that performs only the second communication method PRP, and a dual mode controller 330 that performs both the first communication method STD and the second communication method PRP.

The operating mode determined by the communication method according to the present embodiment varies depending upon a combination of a stylus 100 and a sensor controller 300 as illustrated in FIG. 4. In particular, the operating mode determined in a case in which the stylus 100 is the first stylus 110 and the sensor controller 300 is one of the first sensor controller 310 and the dual mode controller 330 and in another case in which the stylus 100 is the dual mode stylus 130 and the sensor controller 300 is the first sensor controller 310 is a first mode in which the first communication method STD (fields E11, E13, and E31) is performed. Meanwhile, the operating mode determined in a case in which the stylus 100 is the second stylus 120 and the sensor controller 300 is one of the second sensor controller 320 and the dual mode controller 330 and in another case in which the stylus 100 is the dual mode stylus 130 and the sensor controller 300 is the second sensor controller 320 is a second mode in which the second communication method PRP (fields E22, E23, and E32) is performed. In the present embodiment, the cases described above are described in detail below. The case in which the stylus 100 is the dual mode stylus 130 and the sensor controller 300 is the dual mode controller 330 is described in detail in a second embodiment. On the other hand, in a case in which the stylus 100 is the first stylus 110 and the sensor controller 300 is the second sensor controller 320 and in another case in which the stylus 100 is the second stylus 120 and the sensor controller 300 is the first sensor controller 310, since the stylus 100 and the sensor controller 300 cannot discover each other, no operating mode is set.

<1. First Mode>

FIG. 5A is an overview figure of the communication system 1 (first stylus 110 and first sensor controller 310) corresponding to the field E11 of FIG. 4.

The first stylus 110 is configured including a first communication circuit 111 that receives a search signal DS through an electrode 101 and sends back a search response signal ACK in response to the reception of the search signal DS and then transmits a first pen signal P1. The first sensor controller 310 is configured including a first communication circuit 311 that complies with the first communication method STD and a control circuit 340 that performs a first discovery process hereinafter described. The first stylus 110 and the first sensor controller comply with the first communication method STD and are configured to operate in the first mode.

Figure 5B:
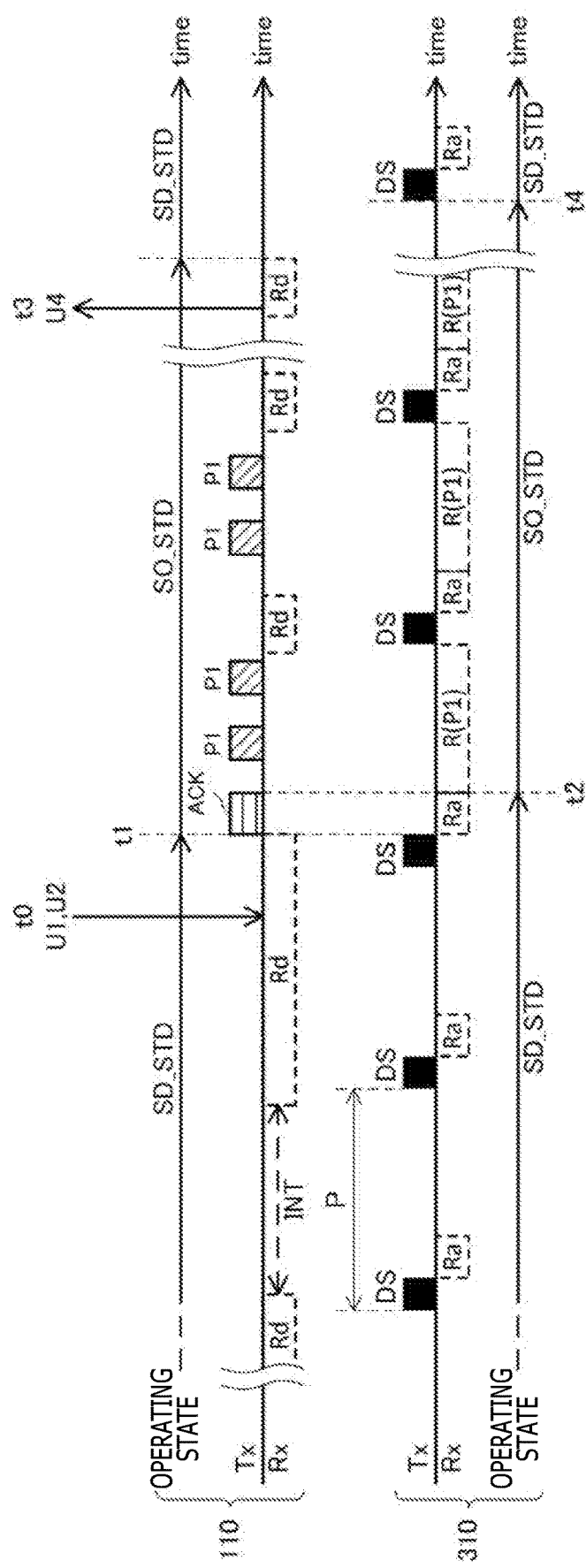
FIG. 5B is a view illustrating operation of a first stylus 110 and a first sensor controller 310 in a first mode, according to one or more embodiments of the present disclosure.

FIG. 5B is a view illustrating operation of the first stylus 110 and the first sensor controller 310 in the first mode. At an upper stage in FIG. 5B, an operating state, a transmission signal Tx, and a reception signal Rx of the first stylus 110 are illustrated in order from above. At a lower stage in FIG. 5B, a transmission signal Tx, a reception signal Rx, and an operating state of the first sensor controller 310 are illustrated in order from above. The axis of abscissa in FIG. 5B indicates time (time), and in an initial state illustrated at the left end, the first stylus 110 is at the start position ST in FIG. 1.

<1.1 Operation of First Sensor Controller 310 in First Mode>

Figure 5C:
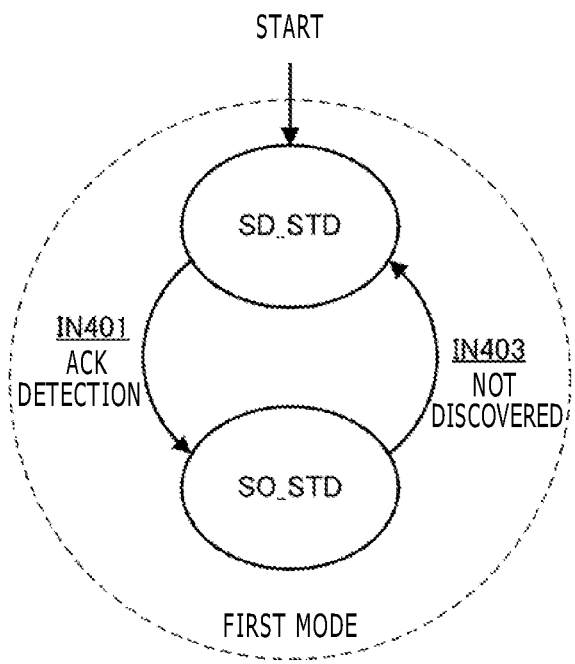
FIG. 5Ca is a state transition diagram of the first sensor controller 310 in the first mode and FIG. 5Cb is a state transition diagram of the first stylus 110 in the first mode, according to one or more embodiments of the present disclosure.
Figure 5C:
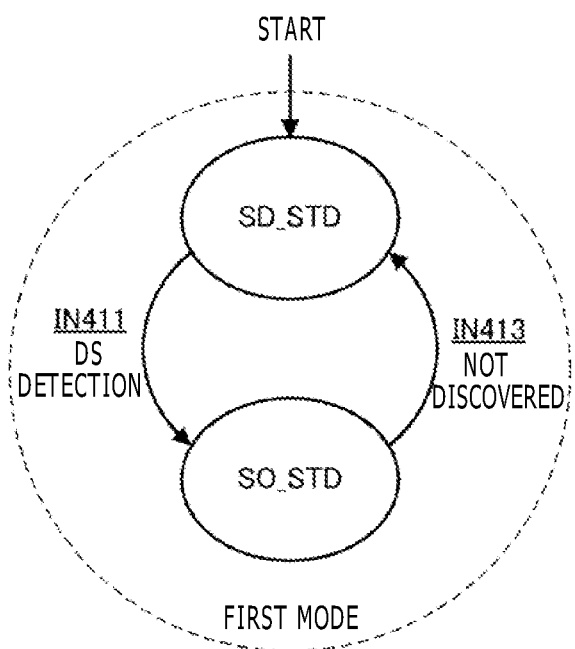

FIG. 5Ca is a state transition diagram of the first sensor controller 310 operating in the first mode. Before time t0 illustrated in FIG. 5B, the first sensor controller 310 is in a first discovery state SD_STD that is a discovery state SD (refer to FIG. 2) in the first mode ("start" of FIG. 5Ca).

The first sensor controller 310 performs a first discovery process in the first discovery state SD_STD. The first discovery process includes a transmission process in which a search signal DS for detecting the first stylus 110 is periodically transmitted, and a reception process in which a search response signal ACK, which is a response from the first stylus 110 to the search signal DS, is received. The reception process of the search response signal ACK is performed within a response reception period Ra that is a period immediately after the search signal DS is transmitted. The first discovery state SD_STD is continued and the first discovery process is repeated as long as a search response signal ACK is not received within the response reception period Ra.

If a pen-down operation U1 is performed at time T0 of FIG. 5B and a first stylus 110 enters the sensing range SR (refer to FIG. 1) of the first sensor controller 310, then it becomes possible the first stylus 110 to detect a search signal DS. Thereafter, as a reply to a search signal DS received first, the first stylus 110 sends back a search response signal ACK (time t1). The first sensor controller 310 detects, at time t2 after time t1, the search response signal ACK transmitted from the first stylus 110 within the response reception period Ra.

Using the detection of the search response signal ACK at time t2 as a trigger, the first sensor controller 310 causes the own operating state to transition from the first discovery state SD_STD to a first operation state SO_STD that is an operation state SO (refer to FIG. 2) corresponding to the first mode ("action state" of FIG. 5B, IN401 of FIG. 5Ca).

In the first operation state SO_STD, the first sensor controller 310 determines a period from a timing immediately after the response reception period Ra to the search signal DS to a timing of starting of sending out of a next search signal DS as a data reception period R(P1), and performs a reception process of the first pen signal P1. Then, position derivation of the first stylus 110 is performed using the received first pen signal P1 and data of a writing pressure and so forth included in the first pen signal P1 is acquired, and information of the coordinate data, writing pressure value and so forth is outputted to the host processor 350.

If a pen-up operation U4 is performed at time t3, then the first sensor controller 310 can no longer receive a signal transmitted from the first stylus 110. If a signal from the first stylus 110 is not received for a fixed time period (time t4), then the first sensor controller 310 causes its own operation state to transition from the first operation state SO_STD to the first discovery state SD_STD (IN403 of FIG. 5Ca). The first sensor controller 310 that transitions to the first discovery state SD_STD performs the first discovery process in such a manner as described above.

<1.2 Operation of First Stylus 110 in First Mode>

FIG. 5Cb is a state transition diagram of the first stylus 110 operating in the first mode. The first stylus 110 is in the first discovery state SD_STD before time t0 illustrated in FIG. 5B ("start" of FIG. 5Cb).

The first stylus 110 operating in the first discovery state SD_STD performs a reception process for receiving the search signal DS transmitted from the first sensor controller 310 within the search signal reception period Rd. The search signal reception period Rd is set so as to continue over a period of time (for example, 25 milliseconds) that is longer than a transmission cycle (=period P) (for example, 20 milliseconds) of the search signal DS and is provided within a fixed interval INT.

If a pen-down operation U1 is performed at time t0, then the first stylus 110 enters the sensing range SR (refer to FIG. 1) of the first sensor controller 310. In the example of FIG. 5B, the first search signal DS is received at time t1 after the first stylus 110 enters the sensing range SR.

The first stylus 110 sends back a search response signal ACK as a response to the search signal DS received in this manner. Further, using the detection of the search signal DS as a trigger, the first stylus 110 causes its own operating state to transition from the first discovery state SD_STD to the first operation state SO_STD (IN411 of FIG. 5Cb). Thereafter, similarly as in the first discovery state SD_STD, the first stylus 110 repeats transmission of the first pen signal P1 using a time slot determined by taking the search signal DS as a reference time point while receiving the search signal SD within the reception period Rd.

If a pen-up operation U4 is performed at time t3 and a signal from the sensor controller 310 is no longer received within the reception period Rd, then the first stylus 110 changes its own operating state from the first operation state SO_STD back to the first discovery state SD_STD (IN413 of FIG. 5Cb).

<2. Second Mode>

Figure 6A:
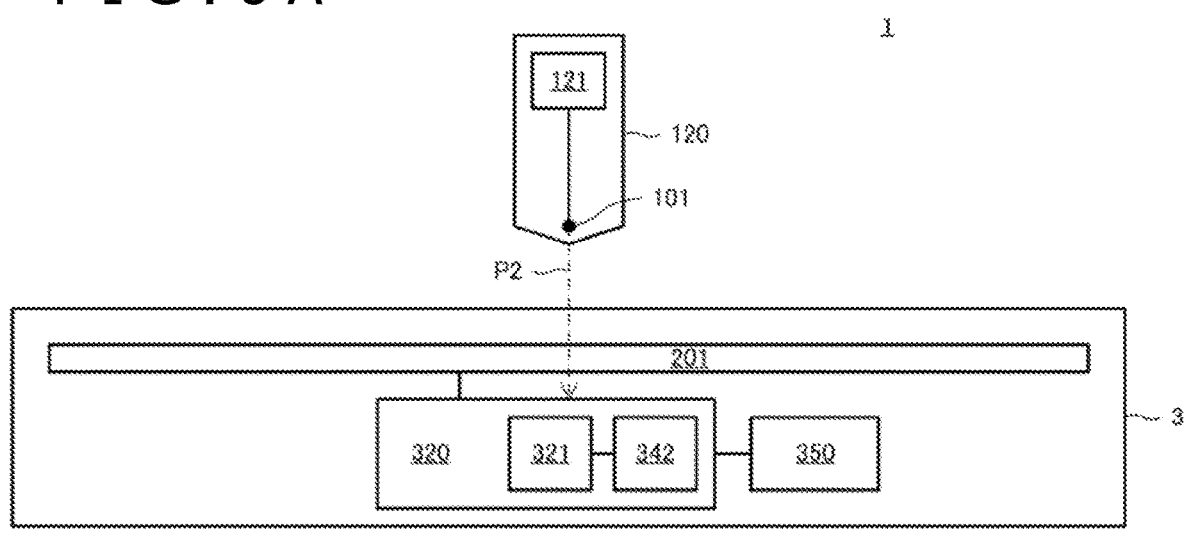
FIG. 6A is an overview figure of the communication system 1 corresponding to a field E22 of FIG. 4, according to one or more embodiments of the present disclosure.

FIG. 6A is an overview figure of the communication system 1 corresponding to the field E22 of FIG. 4 (combination of the second stylus 120 and the second sensor controller 320).

The second stylus 120 is configured including a second communication circuit 121 that transmits a second pen signal P2 that complies with the second communication method PRP. The transmission form of the second pen signal P2 is fully different from the transmission form of the first pen signal P1 illustrated in FIG. 5A. For example, the second pen signal P2 is successively transmitted in one direction similarly to a signal disclosed in Patent Document 1. The second sensor controller 320 is configured including a second communication circuit 321 that receives a signal based on the second communication method PRP and a control circuit 342 that performs a second discovery process described in the following.

Figure 6B:
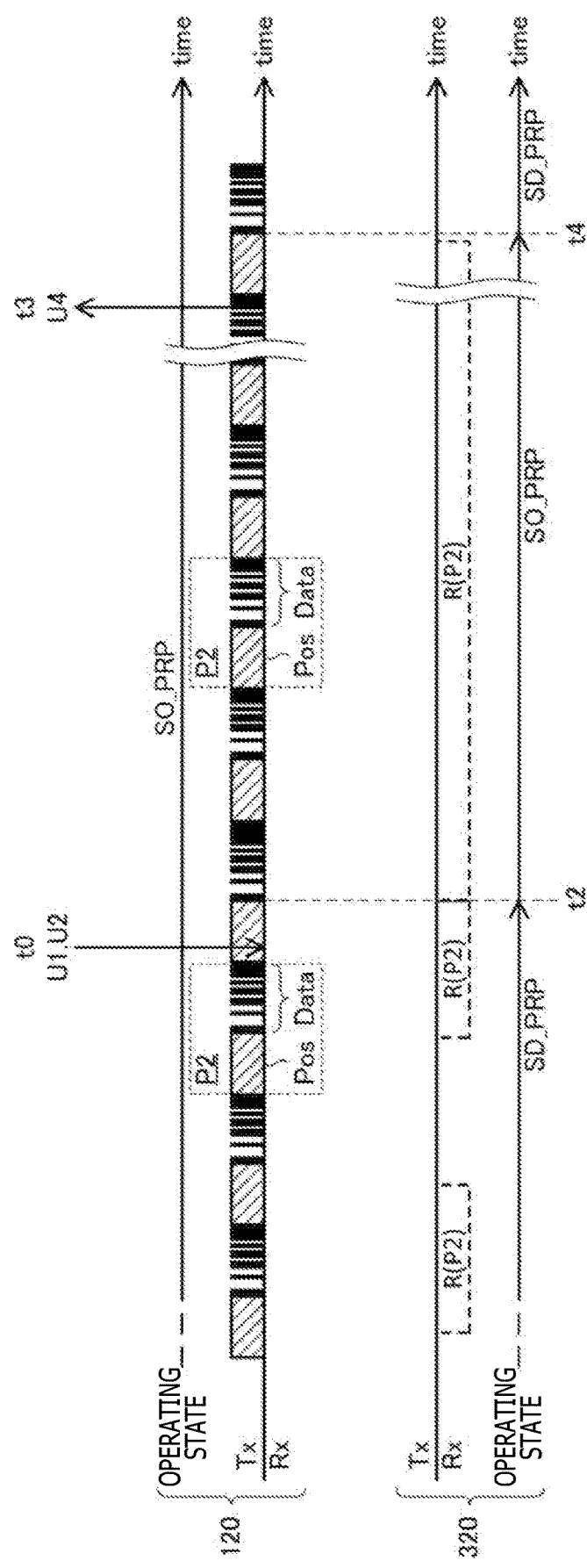
FIG. 6B is a view illustrating operation of a second stylus 120 and a second sensor controller 320 in a second mode, according to one or more embodiments of the present disclosure.

FIG. 6B is a view illustrating operation of the second stylus 120 and the second sensor controller 320 in the second mode. An upper stage in FIG. 6B illustrates an operating state, a transmission signal Tx, and a reception signal Rx of the second stylus 120 in order from above. A lower stage in FIG. 6B illustrates a transmission signal Tx, a reception signal Rx, and an operating state of the second sensor controller 320 in order from above.

In the second communication method PRP according to the present embodiment, transmission of a second pen signal P2 in one direction from the second stylus 120 to the sensor controller 320 is performed. As illustrated in FIG. 6B, the second pen signal P2 is configured including a position signal Pos and a data signal Data. The position signal Pos is a (non-modulated) signal for allowing the second sensor controller 320 to detect a position or existence of the second stylus 120. On the other hand, the data signal Data indicates a data signal obtained by modulating a carrier wave signal with information of a writing pressure or the like or with data.

<2.1 Operation of Second Sensor Controller 320 in Second Mode>

Figure 6C:
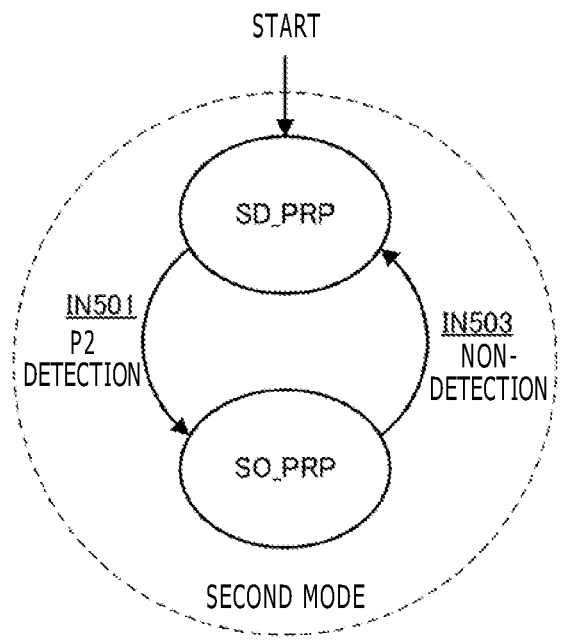
FIG. 6Ca is a state transition diagram of the second sensor controller 320 in the second mode and FIG. 6Cb is a state transition diagram of the second stylus 120 in the second mode, according to one or more embodiments of the present disclosure.
Figure 6C:
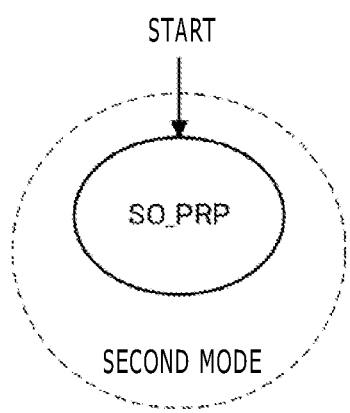

FIG. 6Ca is a state transition diagram of the second sensor controller 320 in the second mode. Before time t0 illustrated in FIG. 6B, the second sensor controller 320 operates in a second discovery state SD_PRP that is a discovery state SD (refer to FIG. 2) corresponding to the second mode ("start" of FIG. 6Ca).

The second sensor controller 320 performs a second discovery process in the second discovery state SD_PRP. The second discovery process includes a detection process for detecting a second pen signal P2 within a reception period that is longer than a prescribed transmission duration of a second pen signal. The second sensor controller 320 repetitively continues the detection process intermittently at fixed intervals.

If a pen-down operation U1 is performed at time t0 of FIG. 6B and the second stylus 120 enters the sensing range SR (refer to FIG. 1) of the second sensor controller 320, then the second sensor controller 320 detects a second pen signal P2 (position signal Pos) transmitted from the second stylus 120 (time t2). Using the reception of the second pen signal P2 as a trigger, the second sensor controller causes its own operating state to transition from the second discovery state SD_PRP to a second operation state SO_PRP that is an operation state SO (refer to FIG. 2) corresponding to the second mode (IN501 of FIG. 6Ca). The second sensor controller 320 in the second operation state SO_PRP successively performs reception of the second pen signal P2. In particular, the second sensor controller 320 performs position derivation of the second stylus 120 from the position signal Pos of the second pen signal P2 and performs acquisition of data of the writing pressure and so forth included in the data signal Data and then outputs coordinate data and information of the writing pressure value and so forth to the host processor 350.

If a pen-up operation U4 is performed at time t3, then the second stylus 120 is retracted from the sensing range SR. As a result, the second sensor controller 320 can no longer detect the second pen signal P2. If a fixed period of time elapses while the second pen signal P2 is not detected, then the second sensor controller 320 causes its own operating state to transition from the second operation state SO_PRP to the second discovery state SD_PRP (IN503 of FIG. 6Ca).

The second sensor controller 320 transitioned to the second discovery state SD_PRP performs the second discovery process in such a manner as described above.

<2.2 Operation of Second Stylus 120 in Second Mode>

FIG. 6Cb is a state transition diagram of the second stylus 120 operating in the second mode. As illustrated in FIG. 6Cb, the second stylus 120 operates immediately in the second operation state SO_PRP from the position of "start." Using inputting of power supply ON or the like as a trigger, the second stylus 120 starts transmission of a second pen signal P2 and continues to transmit the second pen signal P2.

<3. Dual Mode Controller>

Figure 7A:
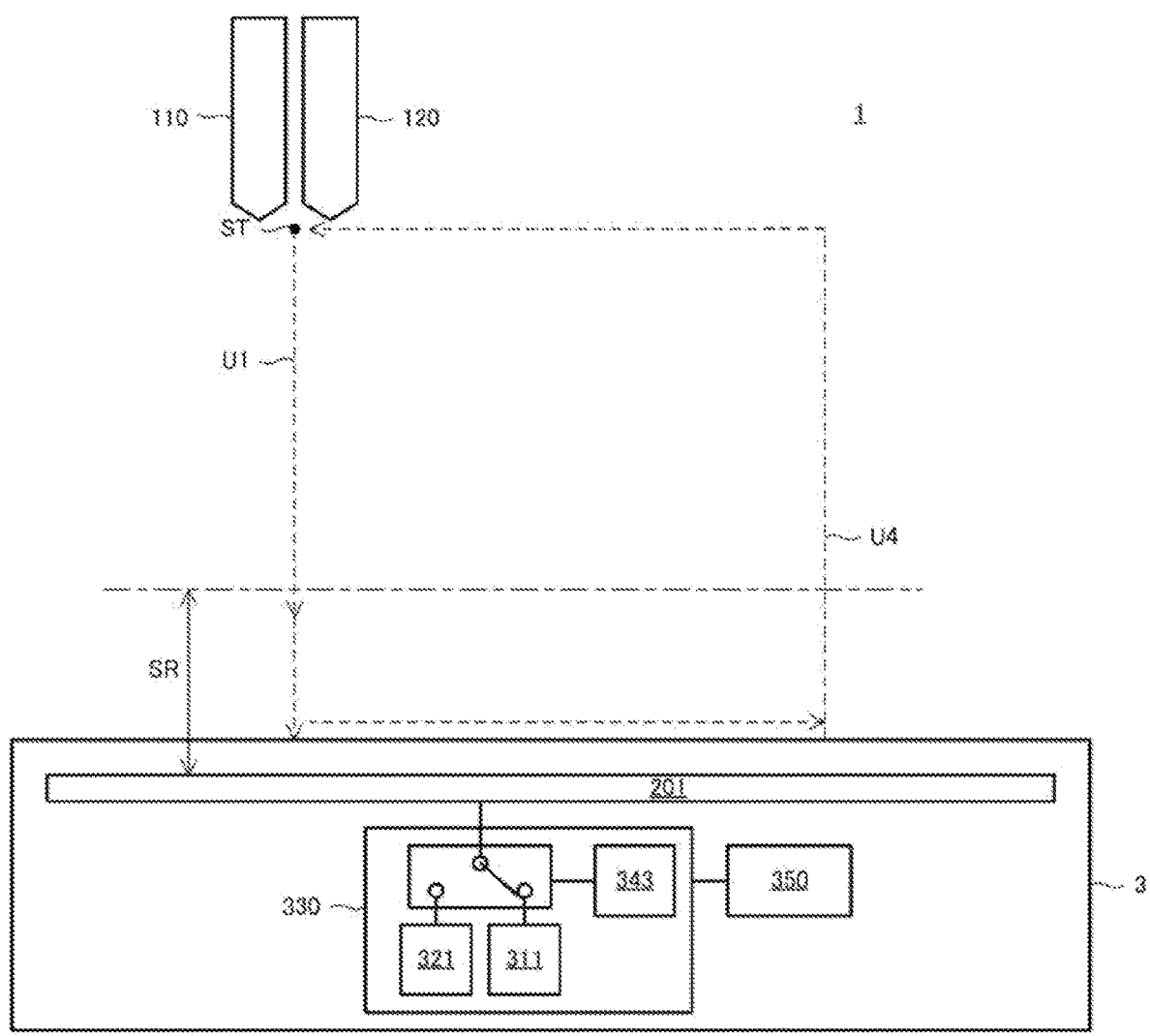
FIG. 7A is an overview figure of the communication system 1 that utilizes a dual mode controller 330, according to one or more embodiments of the present disclosure.

FIG. 7A is an overview figure of a communication system 1 that utilizes the dual mode controller 330 depicted in FIG. 4. In this case, one of two styluses 100 including the first stylus 110 (field E13 of FIG. 4) and the second stylus 120 (field E23 of FIG. 4) is selected by the user and is utilized in operations from the pen-down operation U1 to the pen-up operation U4 illustrated in FIG. 1.

The dual mode controller 330 includes a control circuit 343 in addition to the first communication circuit 311 and the second communication circuit 321 described hereinabove as depicted in FIG. 7A. The control circuit 343 performs a dual mode discovery process for detection of both the first stylus 110 and the second stylus 120 while using the function of the first communication circuit 311 and the function of the second communication circuit 321 alternately. The dual mode controller 330 determines its own operating mode to be one of the first and second modes described hereinabove in response to a type of the stylus detected by the dual mode discovery process and performs an operation for signal reception and succeeding discovery (first discovery process or second discovery process) in the determined operating mode for a predetermined period.

The dual mode discovery process is performed in order to determine an operating mode in the first place separately from the first discovery process in the first operating mode or the second discovery process in the second operating mode.

Figure 7B:
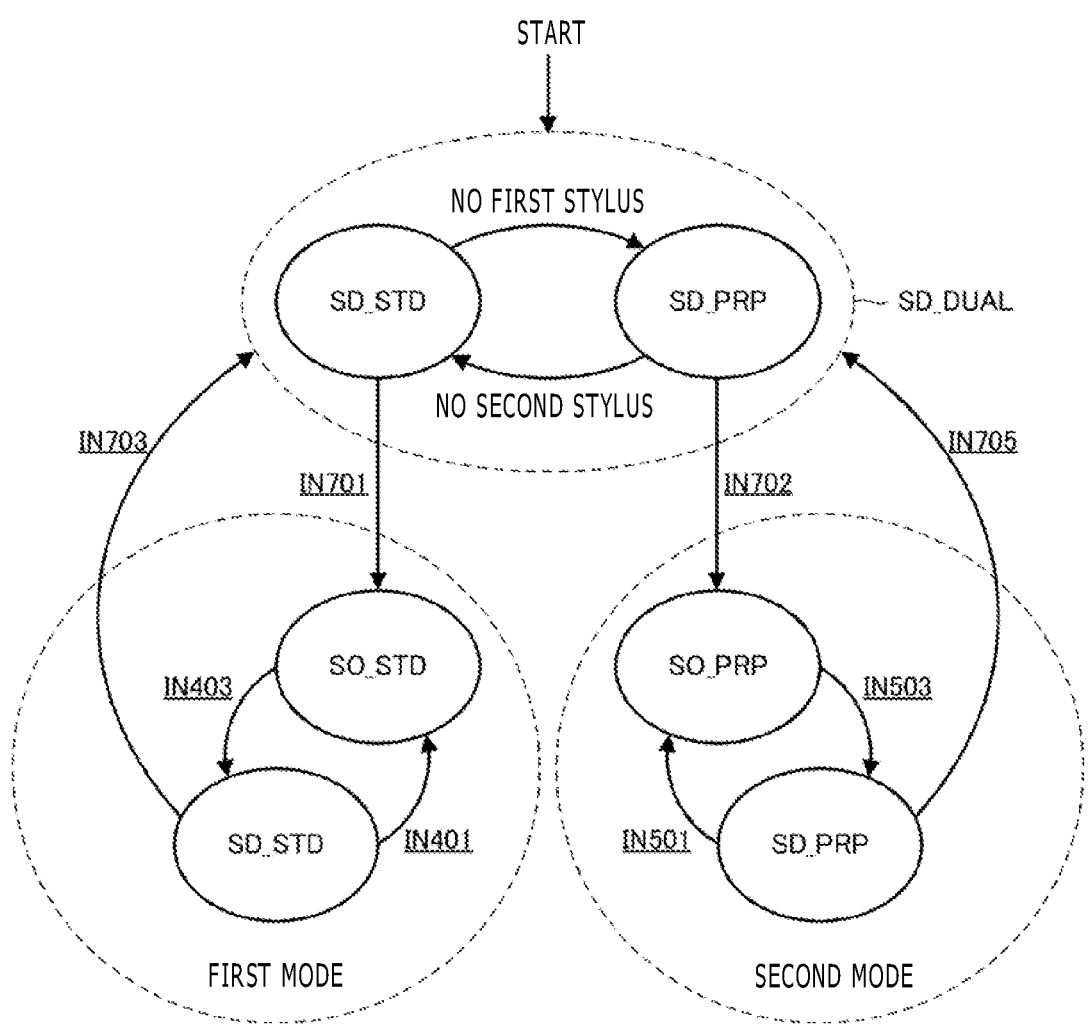
FIG. 7B is a state transition diagram of the dual mode controller 330, according to one or more embodiments of the present disclosure.

FIG. 7B is a state transition diagram of the dual mode controller 330. As illustrated in FIG. 7B, the initial state of the dual mode controller 330 is a dual mode discovery state SD_DUAL for detection of both the first stylus 110 and the second stylus 120. In this dual mode discovery state SD_DUAL, the dual mode controller 330 transitions alternately to a first discovery state SD_STD in which the first discovery process is carried out and a second discovery state SD_PRP in which the second discovery process is carried out. Consequently, the first discovery process and the second discovery process are repeated alternately.

(Dual Mode Discovery)

FIG. 7Ca is a view illustrating an example of the dual mode discovery process. FIG. 7Ca illustrates a transmission signal Tx transmitted from the dual mode controller 330, a reception signal Rx, discovery, and an operating state in order from above.

Within a period from time t0 to time t2, the first discovery process is performed. In particular, the dual mode controller 330 repetitively transmits a search signal DS in a cycle indicated by a period P in FIG. 7Ca and performs the first discovery process using a total time period of a period of time for which at least a search signal DS is sent out and a period of time (response signal reception period Ra) for which a search response signal ACK is waited. The dual mode controller 330 performs a reception process of a search response signal ACK within the response signal reception period Ra. The transmission duration of the search signal DS is shorter than the period P, and accordingly, the search signal DS is transmitted after every interval equal to a time period obtained by subtracting the transmission duration of the search signal DS from the period P. Further, the total time period described above may otherwise include a period of time in which the search signal DS is transmitted and a guard time period for switching the response signal reception period Ra.

Within a period from time t2 to time t4, the second discovery process is performed. In particular, the dual mode controller 330 performs detection of whether or not the second stylus 120 is within the sensing range SR. After time t4, the first discovery process is performed again. In this manner, in the dual mode discovery process, the first discovery process and the second discovery process are repeated alternately.

FIG. 7Cb illustrates another example of the dual mode discovery process. When the first discovery process that includes a transmission process in which a search signal DS is transmitted and a reception process in which a search response signal ACK is received following the transmission process are performed in a cycle of the period P, as can be recognized also from FIG. 7Ca, the dual mode controller 330 remains in a state in which it performs nothing within a period from within the period P after the reception period Ra of a search response signal ACK till the transmission time of a next search signal DS. It is to be noted that this time period after the first stylus 110 is detected is utilized as a period of time for transmission of the first pen signal P1 as illustrated in FIG. 5B.

Therefore, the dual mode controller 330 according to the example of FIG. 7Cb performs, for a period until the first stylus 110 is detected, the second discovery process utilizing the time period for transmission of the first pen signal P1. In other words, the dual mode controller 330 performs the second discovery process taking advantage of at least part of the remaining time period obtained by subtracting the total time period described hereinabove from within the transmission cycle (=period P) of the search signal DS. Consequently, in the dual mode discovery process of FIG. 7Cb, the first stylus 110 and the second stylus 120 can individually be detected in a shorter period of time than that in the dual mode discovery process of FIG. 7Ca.

Referring back to FIG. 7B, if, in the dual mode discovery state SD_DUAL, one of the first stylus 110 and the second stylus 120 is detected once, then the state of the dual mode controller 330 transitions to the operating mode for the detected stylus 100 (one of the first mode of FIGS. 5Ca and 5Cb and the second mode of FIGS. 6Ca and 6Cb) (IN701 or IN702 of FIG. 7B).

For example, if the first stylus 110 is detected, then the dual mode controller 330 determines its own operating mode to be the first mode and causes its own state to transition from the dual mode discovery state SD_DUAL to the first mode of FIGS. 5Ca and 5Cb (mode in which the first operation state SO_STD and the first discovery state SD_STD are repeated) (IN701). After the state of the dual mode controller 330 once transitions to the first mode (the mode is determined to be the first mode), operations in the first operation state SO_STD and the first discovery state SD_STD illustrated in FIGS. 5B and 5C are continued. In particular, different from the dual mode discovery process, only the first discovery state SD_STD for the exclusive use for the first mode is entered, but the second discovery state SD_PRP is not entered.

On the other hand, for example, if the second stylus is detected, then the dual mode controller 330 causes its own state from the dual mode discovery state SD_DUAL to the second mode of FIGS. 6Ca and 6Cb (mode in which the second operation state SO_PRP and the second discovery state SD_PRP are repeated). After the operation transitions to the second mode once, operations according to the second operation state SO_PRP and the second discovery state SD_PRP illustrated in FIGS. 6B and 6C are continued.

The dual mode controller 330 that once starts the operation in the first mode or the second mode returns to the dual mode discovery state SD_DUAL only when a stylus is not discovered even if the started discovery process performed in the operating mode is repeated for a fixed period of time (IN703 or IN704 of FIG. 7B).

<3.1 Example of Operating Communication System 1 Corresponding to Field E13 Depicted in FIG. 4>

Figure 7D:
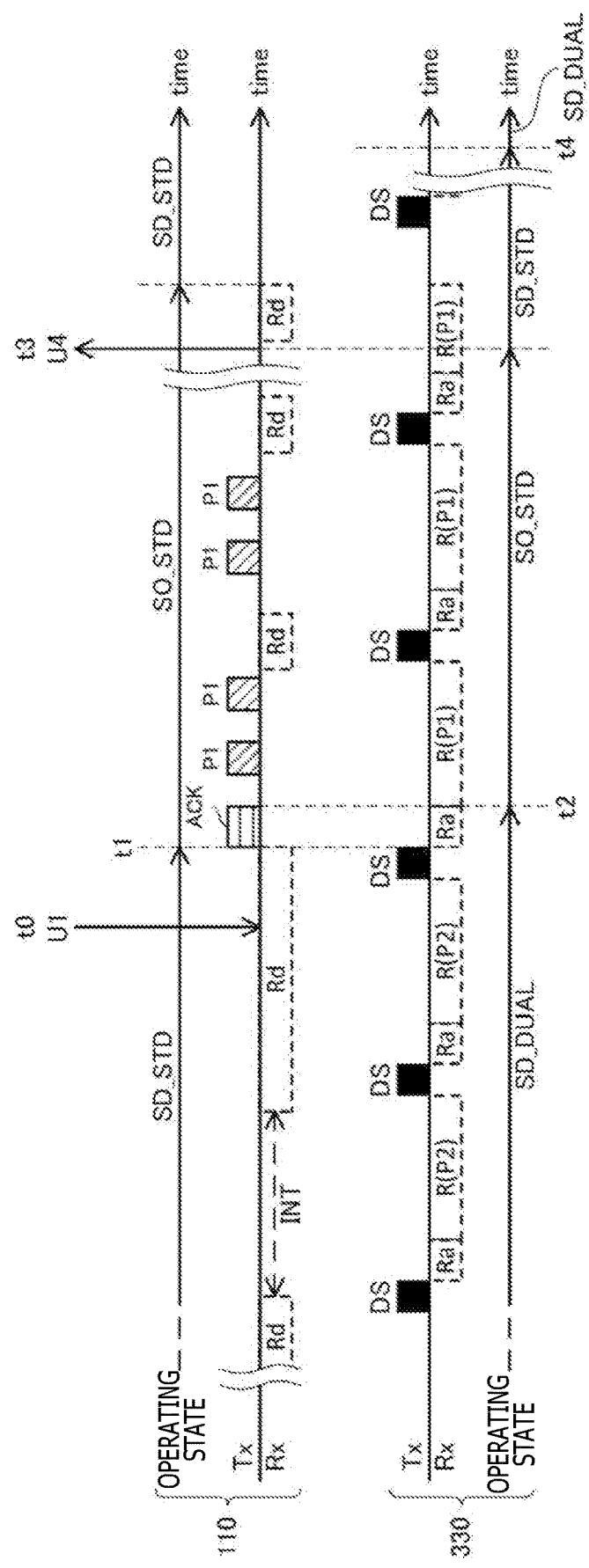
FIG. 7D is a view illustrating operation of the communication system 1 corresponding to a field E13 depicted in FIG. 4, according to one or more embodiments of the present disclosure.

FIG. 7D illustrates an example of operating the communication system 1 corresponding to the field E13 depicted in FIG. 4 (combination of the dual mode controller 330 and the first stylus 110).

In the present example, till time t0, the dual mode controller 330 is in the dual mode discovery state SD_DUAL and alternately repeats the first discovery process and the second discovery process (refer to FIG. 7Cb).

If, at time t0, a pen-down operation U1 is performed and the first stylus 110 enters the sensing range SR (refer to FIG. 7A) of the dual mode controller 330, then in response to a search signal DS transmitted first since then, a search response signal ACK is transmitted back from the first stylus 110 at time t2. The dual mode controller 330 receives the search response signal ACK and thereby detects the first stylus 110.

After the first stylus 110 is detected once, the dual mode controller 330 sets its own operating state to the first mode (more particularly, to the first operation state SO_STD). In the first mode, the dual mode controller 330 repeats a transmission process in which the search signal DS is transmitted at fixed intervals and performs a reception process for receiving the first pen signal P1 using a time slot that uses the search signal DS as a reference time point. More particularly, the dual mode controller 330 uses the entire remaining time period when the total time period described hereinabove (total time period of the transmission time period of the search signal DS, the response signal reception period Ra, and the guard time period where the guard time period is provided) is subtracted from the transmission cycle of the search signal DS (=period P depicted in FIG. 7Cb), for reception of the first pen signal P1. Since this disables performance of the second discovery process, even if the second stylus 120 comes close to the dual mode controller 330, this is not detected any more by the dual mode controller 330.

Also after the user ends its hand writing at time t3 and the stylus 100 goes out of the sensing range SR by a pen-up operation U4, the dual mode controller 330 repeats only the first discovery process as an operation in the first mode for a fixed period of time. Thereafter, if no first stylus 110 is detected even if the first discovery process is performed, then the dual mode controller 330 returns to the dual mode discovery state SD_DUAL and restarts the dual mode discovery process (time t4 of FIG. 4).

<3.2 Example of Operating Communication System 1 Corresponding to Field E23 Depicted in FIG. 4>

Figure 7E:
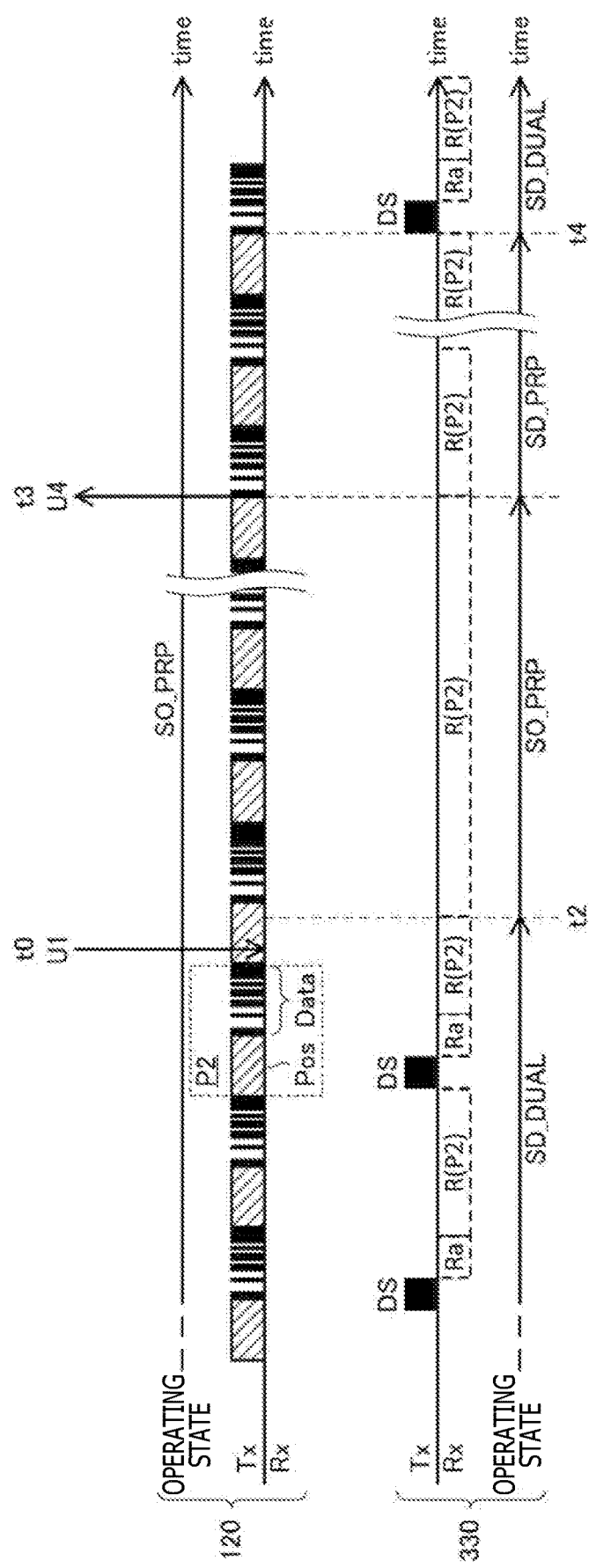
FIG. 7E is a view illustrating operation of the communication system 1 corresponding to a field E23 depicted in FIG. 4, according to one or more embodiments of the present disclosure.

FIG. 7E illustrates an example of operating the communication system 1 corresponding to the field E23 depicted in FIG. 4 (combination of the dual mode controller 330 and the second stylus 120).

If a pen-down operation U1 is performed at time t0 and the second stylus 120 enters the sensing range SR (refer to FIG. 7A) of the dual mode controller 330, then the dual mode controller 330 detects a second pen signal P2 transmitted later from the second stylus 120 at time t2. Then, the dual mode controller 330 sets its own operating mode to the second mode (more particularly, to the second operation state SO_PRP).

Even if a pen-up operation U4 is performed at time t3 and the second stylus 120 is spaced away from the sensing range SR, the dual mode controller 330 repeats only the second discovery process for a fixed period of time as an operation in the second mode. Thereafter, if no second stylus 120 is detected even if the second discovery process is performed, then the dual mode controller 330 returns to the dual mode discovery state SD_DUAL and restarts the dual mode discovery process (at time t4 of FIG. 4).

In this manner, the dual mode controller 330 performs the dual mode discovery process in which a plurality of different types of discoveries are performed alternately in order to cope with a plurality of different types of styluses 100 and determines a succeeding operating mode on the basis of a detected signal. In particular, the dual mode controller 330 determines the operating mode to one of the first mode in which the first pen signal P1 is received and the first discovery process is performed, and the second mode in which the second pen signal P2 different at least in format from the first pen signal P1 is received and the second discovery process is performed. The dual mode controller 330 switches its own operating mode to the operating mode determined in this manner and thereafter performs a signal reception process and so forth on the basis of the determined operating mode.

Consequently, whichever one of the first stylus 110 and the second stylus 120 is to be utilized by the user, it becomes possible for the dual mode controller 330 to switch to and operate in an operating mode ready therefor.

Further, after the operating mode transitions to the first or second mode, even if detection of the stylus 100 is disabled, the dual mode controller 330 does not immediately return to the dual mode discovery state but performs discovery processes in the individual operating modes. After a certain kind of stylus 100 is detected once, the possibility that the same kind of stylus 100 may be utilized subsequently is high, and therefore, the period of time till detection of the stylus 100 can be reduced in comparison with that in an alternative case in which switching to the dual mode discovery process is performed immediately.

<4. Dual Mode Stylus>

Figure 8A:
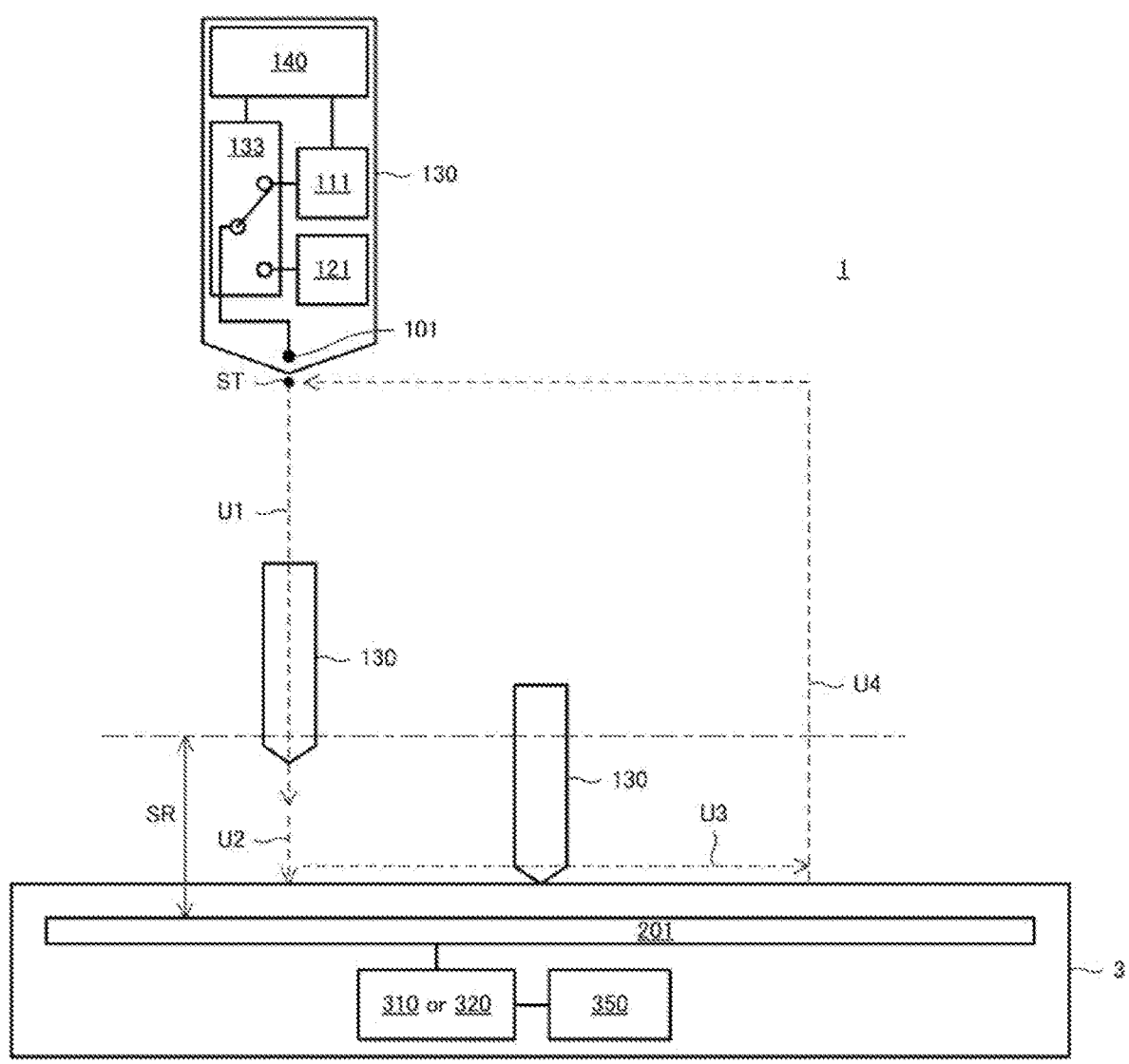
FIG. 8A is an overview figure of the communication system 1 that utilizes a dual mode stylus 130, according to one or more embodiments of the present disclosure.

FIG. 8A is a view depicting an example of the communication system 1 that utilizes the dual mode stylus 130 depicted in FIG. 4. The communication system 1 according to the present example is configured from a dual mode stylus 130, and one of a first sensor controller 310 that performs only the first communication method STD (field E31 of FIG. 4) and a second sensor controller 320 that performs only the second communication method PRP (field E32 of FIG. 4). It is to be noted that, in FIG. 8A, like elements denoted by the same reference symbols to those in FIG. 1 are similar to those described hereinabove with reference to FIG. 1 and description of them is omitted.

The dual mode stylus 130 cannot know which one of the first sensor controller 310 and the second sensor controller 320 the type of the sensor controller 300 that is a partner with which the dual mode stylus 130 itself is to communicate from now on is before the sensor controller 300 enters the sensing range SR by the pen-down operation U1 illustrated in FIG. 8A. The dual mode stylus 130 is utilized in a mixed environment in which a case in which the sensor controller 300 to be utilized in combination with the dual mode stylus 130 itself is the first sensor controller 310 that transmits a search signal DS to the stylus 100 to perform bidirectional communication and another case in which the sensor controller 300 is the second sensor controller 320 that performs only reception of the second pen signal P2 transmitted from the stylus 100 are mixed.

The communication method which the dual mode controller 330 performs not only with the first stylus 110 but also with the second stylus 120 can be applied to the dual mode stylus 130 that operates in the first mode or the second mode. For example, the first stylus 110 that operates only in the first mode pauses the first discovery process for a period of an interval INT after a process for detecting a search signal DS is performed in the first discovery state SD_STD as illustrated in FIG. 5B. It seems recommendable to utilize the pause period as a period for allowing the second sensor controller 320 to detect itself, namely, as a period for transmitting the second pen signal P2. Description is given particularly with reference to the drawings below.

As depicted in FIG. 8A, the dual mode stylus 130 is configured including a first communication circuit 111, a second communication circuit 121, a switch 133, a mode controlling circuit 140, and an electrode 101.

The first communication circuit 111 is the same as that depicted in FIG. 5A and performs the first communication method STD (reception process and transmission process) in which bidirectional communication is performed. The second communication circuit 121 is the same as that depicted in FIG. 6A and performs the second communication method PRP (transmission process) in which unidirectional communication is performed.

The mode controlling circuit 140 controls the switch 133 to switch the connection destination of the electrode 101 between the first communication circuit 111 and the second communication circuit 121 thereby to perform control for switching the operating mode of the dual mode stylus 130 between the first mode and the second mode.

Describing particularly, the mode controlling circuit 140 first sets the dual mode stylus 130 to a discovery state (state S600 illustrated in FIG. 8B hereinafter described). In this state, the mode controlling circuit 140 controls the dual mode stylus 130 such that reception processing for detecting a search signal DS (reception process is performed in the first mode, state S610 illustrated in FIG. 8B hereinafter described) and transmission processing of the second pen signal P2 (transmission process in the second mode, state S621 illustrated in FIG. 8B hereinafter described) are repeated alternately. It is to be noted that the search signal DS is a signal that is to be transmitted, if the sensor controller 300 is the first sensor controller 310, from the first sensor controller 310 to the dual mode stylus 130 on the basis of the first communication method STD in which bidirectional communication is performed. Meanwhile, the second pen signal P2 is a signal that is transmitted intermittently from the second stylus 120 to the sensor controller 320 on the basis of the second communication method PRP in which unidirectional communication from the stylus 100 toward the second sensor controller 320 is performed.

The mode controlling circuit 140 stops, when it detects a search signal DS in the discovery state S600, sending out of the second pen signal P2 and switches the operating mode of the dual mode stylus 130 to the first mode (state S612 illustrated in FIG. 8B hereinafter described).

Further, the mode controlling circuit 140 performs a process for monitoring the writing pressure while the dual mode stylus 130 remains in the discovery state. Consequently, if a tip end of the dual mode stylus 130 is brought into touch with the operation face of the electronic apparatus 3 by a pen touch operation U2 of the user, then the mode controlling circuit 140 detects an effective writing pressure value (value higher than 0). Although details are hereinafter described with reference to FIG. 8B, if the mode controlling circuit 140 detects that the dual mode stylus 130 is brought into contact with the operation face, then the mode controlling circuit 140 controls the dual mode stylus 130 to stop the reception process in the first mode (namely, intermittent detection of a search signal DS) and continuously performs transmission of the second pen signal P2 in the second mode (state S620 illustrated in FIG. 8B hereinafter described).

The mode controlling circuit 140 continuously performs the process for monitoring the writing pressure also since then and detects, when it detects that an effective writing pressure value is not detected any more, that the dual mode stylus 130 is spaced from (brought out of touch with) the operation face by a pen-up operation U4 or the like (IN2200 illustrated in FIG. 8B hereinafter described). Then, the mode controlling circuit 140 controls the dual mode stylus 130 to return to the discovery state (state S600 illustrated in FIG. 8B hereinafter described).

Figure 8B:
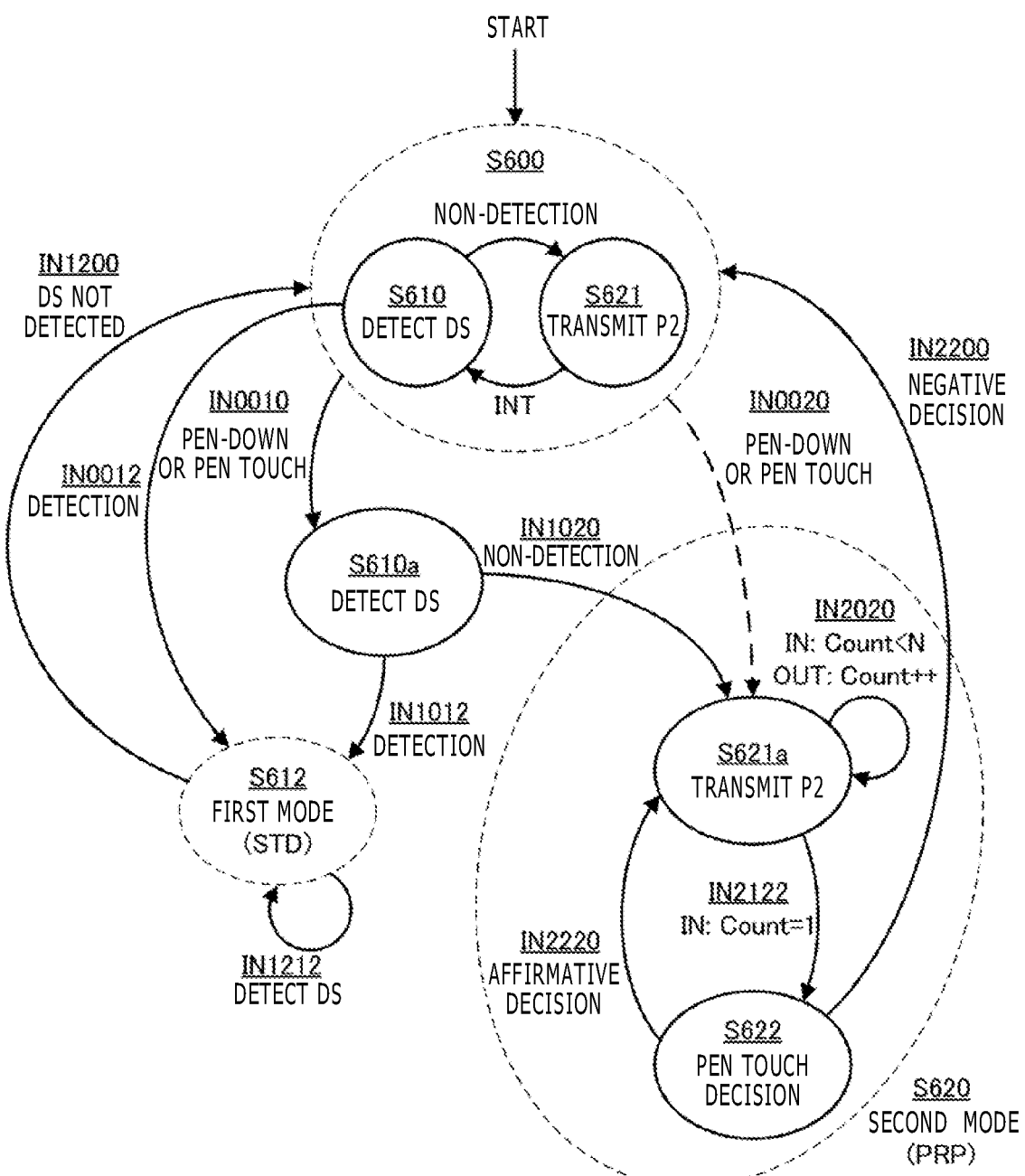
FIG. 8B is a state transition diagram of the dual mode stylus 130, according to one or more embodiments of the present disclosure.

FIG. 8B is one example of a state transition diagram of the dual mode stylus 130. As illustrated in FIG. 8B, the initial state of the dual mode stylus 130 is a dual mode discovery state S600 in which processes for detection of both the first sensor controller 310 and the second sensor controller 320 are performed. In the dual mode discovery state S600, the dual mode stylus 130 alternately and time-divisionally performs a reception process by the first communication circuit 111 for detecting a search signal DS (reception process in the first mode, state S610) and a transmission process by the second communication circuit 121 for intermittently transmitting a second pen signal P2 (transmission process in the second mode, state S621). The dual mode discovery state S600 is continued until a search signal DS is detected (IN0012) or a pen-down operation U1 (or a succeeding pen touch operation U2) is detected (IN0010 or IN0020).

If a pen-down operation U1 or a pen touch operation U2 is detected in the dual mode discovery state S600, then the dual mode stylus 130 carries out a reception process by the first communication circuit 111 for detecting a search signal DS again (state S610a). It is to be noted that the detection of the pen touch operation U2 can be performed, for example, by detection or the like of an effective writing pressure value (value higher than 0) by a writing pressure detection circuit (not detected) provided in the dual mode stylus 130.

The state S610a is a state in which a process for enabling, in a state in which the pen touch operation U2 has been performed already and a sliding operation U3 is started, the dual mode stylus 130 to perform a process for compulsorily determining which one of the first communication method STD and the second communication method PRP is to be used for communication.

If a search signal DS is detected in the state S610a, then the dual mode stylus 130 transitions to another state S612, in which it starts operating in the first mode. In the state S612, the operating in the first mode is continued as long as communication in the first mode is maintained such as to detect a search signal DS in a predetermined cycle (IN1212).

On the other hand, if no search signal DS is detected in the state S610a, then the dual mode stylus 130 transitions to a state S620 and starts operating in the second mode.

Here, also it is possible to omit the operating in the state S610a (IN0020). In particular, that the pen touch operation U2 is performed (an effective writing pressure value is detected) while no search signal DS is detected in the dual mode discovery state S600 signifies with a high degree of probability that the sensor controller 300 does not transmit a search signal DS as yet. In other words, it is considered that the probability that the sensor controller 300 may be the second sensor controller 320 is high. Accordingly, it is considered that, even if the dual mode stylus 130 transitions directly to the state S620 without transitioning to the state S610a to confirm presence or absence of a search signal DS, the possibility that a same result as that obtained when the state S610a intervenes may be obtained is high. Besides, the dual mode stylus 130 can transition to the state S620 more rapidly as the state S610a does not intervene.

In the second mode of the state S620, the dual mode stylus 130 repeats transmission of a second pen signal P2 based on the second communication method PRP by a predetermined number of times (for example, before the Count value does not exceed N) (state S621a). Then, after this repetition ends, the dual mode stylus 130 transitions to a state S622 in which it is to be decided whether or not it touches with the operation face (IN2122).

If it is decided that the dual mode stylus 130 touches the operation face in the state S622, then the dual mode stylus 130 returns to the state S621a (IN2220) and performs repetitive transmission of a second pen signal P2 again. On the other hand, if it is decided that the dual mode stylus 130 does not touch with the operation face in the state S622 (if it is decided that the dual mode stylus 130 is spaced from the operation face), then the dual mode stylus 130 returns to the dual mode discovery state S600 (IN2200) and performs detection of a search signal DS and an intermittent transmission operation of the second pen signal P2 again.

Figure 8C:
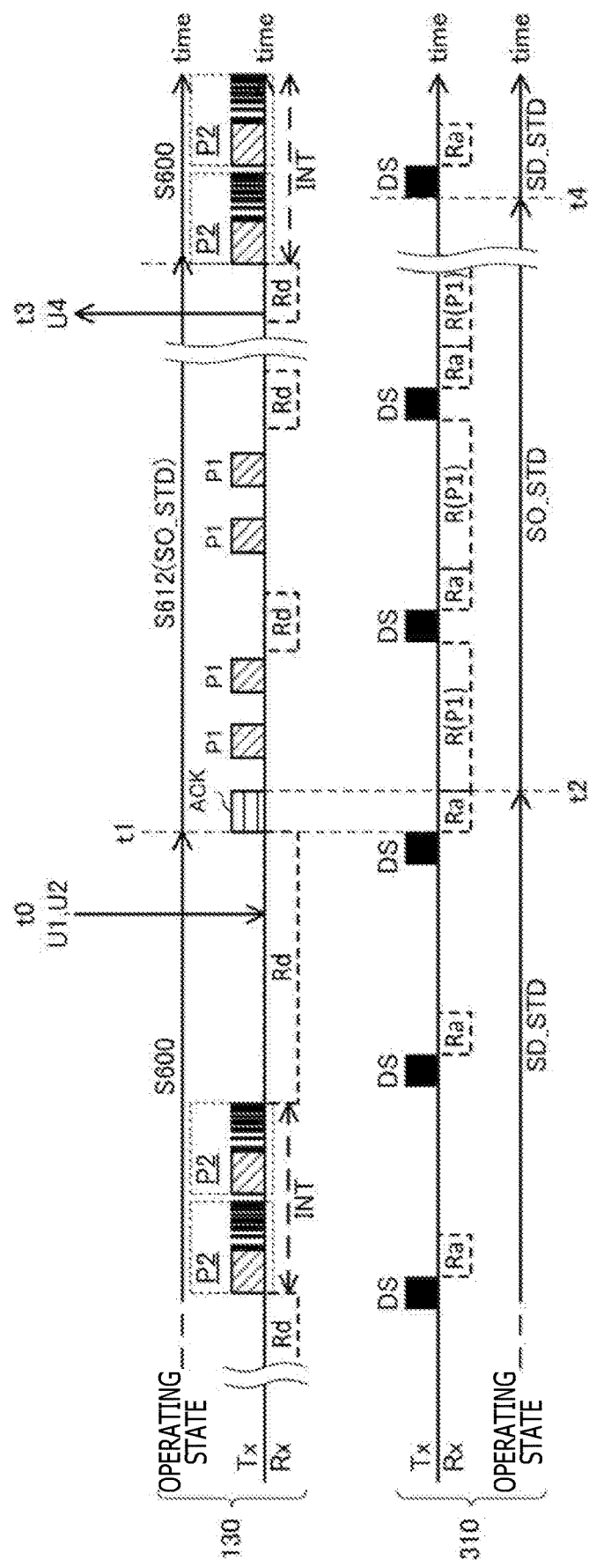
FIG. 8C is a view illustrating operation of the communication system 1 corresponding to a field E31 depicted in FIG. 4, according to one or more embodiments of the present disclosure.

FIG. 8C illustrates an example of operating of the communication system 1 corresponding to the field E31 depicted in FIG. 4 (combination of the first sensor controller 310 and the dual mode stylus 130). In FIG. 8C, like elements denoted by the same reference symbols to those in FIG. 5B or 6B are similar to those described hereinabove with reference to FIG. 5B or 6B and description of them is omitted. An upper stage in FIG. 8C indicates an operating state, a transmission signal Tx, and a reception signal Rx of the dual mode stylus 130 in order from above. A lower stage in FIG. 8C indicates a transmission signal Tx, a reception signal Rx, and an operating state of the first sensor controller 310.

<4.1 Operation of First Sensor Controller 310>

Since the operation of the first sensor controller 310 is same as the operation described hereinabove with reference to FIG. 4B, which is original operation of the first sensor controller 310, description of the same is omitted.

<4.2 Operation of Dual Mode Stylus 130>

Before time t0, the dual mode stylus 130 operates in the dual mode discovery state S600 illustrated in FIG. 8B. The dual mode stylus 130 in the dual mode discovery state S600 performs a reception process for receiving a search signal DS from the first sensor controller 310 within a search signal reception period Rd. The reception period Rd for the search signal DS is set to a continuous time period (for example, 20 milliseconds) longer than the transmission interval (for example, 16 milliseconds) of the search signal DS such that the search signal DS can be detected in a minimum time interval after a pen touch operation U2 is performed once and besides is provided after a fixed interval INT. The dual mode stylus 130 utilizes the period of the interval INT to intermittently transmit the second pen signal P2.

If a pen-down operation U1 is performed at time t0, then the dual mode stylus 130 enters the sensing range SR (refer to FIG. 8A). After entering the sensing range SR, the dual mode stylus 130 receives a first search signal DS at time t1.

The dual mode stylus 130 causes its own operating state to transition from the dual mode discovery state S600 to the first mode (state S612 illustrated in FIG. 8B) using detection of a search signal DS as a trigger (IN0012 illustrated in FIG. 8B). Further, the dual mode stylus 130 returns a search response signal ACK as a response signal to the search signal DS.

Within a period from time t2 to time t3, the dual mode stylus 130 continues to operate in the state of the first mode. In particular, while the dual mode stylus 130 repetitively receives a search signal DS in the reception period Rd, the dual mode stylus 130 repeats transmission of the first pen signal P1 using a time slot that uses the search signal DS as a reference time point.

At time t3, if a pen-up operation U4 is performed by the user, whereupon the dual mode stylus 130 goes out of the sensing range SR and reception of a signal from the first sensor controller 310 is not performed any more within the reception period Rd, then the dual mode stylus 130 returns its own operating state from the first mode to the dual mode discovery state S600 again (IN1200 illustrated in FIG. 8B).

FIG. 8D illustrates an example operation of the communication system 1 corresponding to the field E32 depicted in FIG. 4 (combination of the second sensor controller 320 and the dual mode stylus 130). In FIG. 8D, like elements denoted by the same reference symbols to those in FIG. 5B or 6B are similar to those described hereinabove with reference to FIG. 5B or 6B, and therefore, description of them is omitted. An upper stage in FIG. 8D indicates an operating state, a transmission signal Tx, and a reception signal Rx of the dual mode stylus 130 in order from above. A lower stage in FIG. 8D indicates a transmission signal Tx, a reception signal Rx, and an operating state of the second sensor controller 320 in order from above.

<5.1 Operation of Second Sensor Controller 320>

The operation of the second sensor controller 320 is same as the operation described hereinabove with reference to FIG. 6B, which is original operation of the second sensor controller 320, and therefore, description of the same is omitted herein.

<5.2 Operation of Dual Mode Stylus 130>

Before time t0, the dual mode stylus 130 operates in the dual mode discovery state S600 illustrated in FIG. 8B. The dual mode stylus 130 in the dual mode discovery state S600 performs a reception process of a search signal DS from the first sensor controller 310 within a search signal reception period Rd. Further, the dual mode stylus 130 utilizes the interval INT of the reception period Rd to intermittently transmit a second pen signal P2.

If a pen-down operation U1 is performed at time t0, then the dual mode stylus 130 enters the sensing range SR (refer to FIG. 8A). Further, if a pen touch operation U2 is performed, then the dual mode stylus 130 detects this from a variation of the writing pressure value. The dual mode stylus 130 that has detected the pen touch operation U2 switches its own operating state to the second mode (state S620 illustrated in FIG. 8B) (IN0020 illustrated in FIG. 8B) and starts repetitive transmission of a second pen signal P2 (IN2020 illustrated in FIG. 8B). Thereafter, for a period till time t3, the dual mode stylus 130 continues to transmit the second pen signal P2.

If a pen-up operation U4 is performed at time t3 by the user, then the dual mode stylus 130 detects this from a variation of the writing pressure value. Then, the dual mode stylus 130 detecting the pen-up operation U4 returns its own operating state from the second mode to the dual mode discovery state S600 again (IN2200 illustrated in FIG. 8B).

In this manner, the dual mode stylus 130 according to the present embodiment performs the dual mode discovery process by which a reception process of a search signal DS based on the first communication method STD (bidirectional communication) and an intermittent transmission process of a second pen signal based on the second communication method PRP (unidirectional transmission) are repeated alternately. Further, after the pen touch operation U2 is detected, a transmission process of the second pen signal P2 is performed continuously.

By this configuration, where the dual mode stylus 130 is combined with the first sensor controller 310 that sends out a search signal DS to the stylus 100, the dual mode stylus 130 operates in the first mode in which the first communication method STD is performed. On the other hand, where the dual mode stylus 130 is utilized in combination with the second sensor controller 320 that performs only a reception process of a second pen signal P2 without performing transmission of a search signal DS, after the dual mode stylus 130 detects a pen touch operation U2 of the user which corresponds to a timing at which it is to be actually utilized effectively on the operation face, the dual mode stylus 130 is enabled to continuously operate in the ordinary second mode in which the second pen signal P2 is transmitted.

In this manner, with the present embodiment, the dual mode stylus 130 can be implemented which is useful with whichever one of the first sensor controller 310 that utilizes bidirectional communication and the second sensor controller 320 that utilizes unidirectional reception the dual mode stylus 130 is utilized in combination.

As described above, with the first embodiment of the present disclosure, whichever one of the fields E11, E13, E22, E23, E31, and E32 depicted in FIG. 4 the combination of the sensor controller 300 and the stylus 100 is, pen inputting can be performed using them suitably.

Second Embodiment

Now, a second embodiment of the present disclosure is described. Also the present embodiment relates to a communication method between a stylus 100 and a sensor controller 300.

As the stylus 100, various types of styluses indicated in rows of the table of FIG. 11 hereinafter described are available. Types of FIG. 11 are particularized ones of the types of the stylus 100 (the first stylus 110, the second stylus 120, and the dual mode stylus 130) indicated in the rows of the table of FIG. 3 by distinguishing the second communication method into a 2-1st communication method and a 2-2nd communication method. In particular, as the stylus 100, five different types of styluses 100 are available which include a first stylus 110 including the first communication circuit 111 that performs only the first communication method, a second stylus 120 including the second communication circuit 121 that performs only the 2-1st communication method, another second stylus 120 including a second communication circuit 122 that performs only the 2-2nd communication method, a dual mode stylus 130 including the second communication circuit 121 for implementing an expansion function in addition to the first communication circuit 111, and another dual mode stylus 130 including the second communication circuit 122 for implementing an expansion function in addition to the first communication circuit 111.

Similarly, as the sensor controller 300, types of sensor controllers indicated in columns of the table of FIG. 11 are available. The types in FIG. 11 are particularized ones of the types of the sensor controller 300 (the first sensor controller 110, the second sensor controller 120, and the dual mode controller 130) indicated in the columns of the table of FIG. 3 by distinguishing the second communication method into the 2-1st communication method and the 2-2nd communication method. In particular, as the sensor controller 300, five different types of sensor controllers 300 are available which include a first sensor controller 310 including the first communication circuit 311 that performs only the first communication method, a second sensor controller 320 including the second communication circuit 321 that performs only the 2-1st communication method, another second sensor controller 320 including a second communication circuit 322 that performs only for the 2-2nd communication method, a dual mode controller 330 including the second communication circuit 321 for implementing an expansion function in addition to the first communication circuit 311, and another dual mode controller 330 including the second communication circuit 322 for implementing an expansion function in addition to the first communication circuit 311.

For the communication system 1 configured from the stylus 100 and the sensor controller 300, at least 25 different combinations are available depending upon one of the five different types of styluses 100 and one of the five different types of sensor controllers 300. In the present embodiment, one of the first communication method and the second communication method (2-1st communication method or 2-2nd communication method) is determined and performed on the basis of a discovery hereinafter described.

Figure 9A:
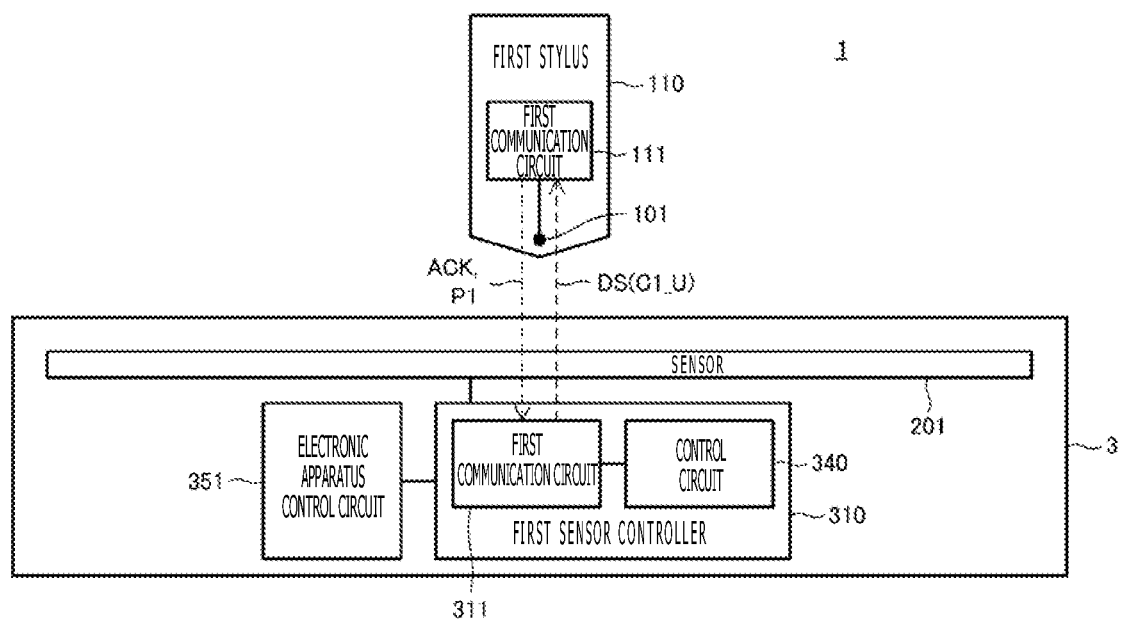
FIG. 9A is an overview figure depicting an example of the communication system 1 that performs a first communication method, according to one or more embodiments of the present disclosure.

FIG. 9A is an overview figure depicting an example of the communication system 1 that performs the first communication method. The communication system 1 of FIG. 9A is configured including a first stylus 110 and a first sensor controller 310. The first stylus 110 and the first sensor controller 310 correspond to the first stylus 110 and the first sensor controller 310 according to the first embodiment depicted in FIG. 5A, respectively.

Although the first stylus 110 is a kind of capacitive stylus of the active type and can perform communication that complies with the first communication method with the first sensor controller 310, it cannot perform communication that complies with the second communication method. The first stylus 110 is configured including a first communication circuit 111 and an electrode 101.

The first communication circuit 111 performs bidirectional communication with the first sensor controller 310, which complies with the first communication method and in which capacitive coupling between a stylus and a sensor is utilized. The first communication circuit 111 includes an oscillation circuit not depicted and transmits a response signal ACK and a first pen signal P1 in compliance with the first communication method through the electrode 101.

The first stylus 110 in the present embodiment transmits a response signal ACK in which function information FD that describes a function executable by the first stylus 110, which is information that does not vary depending upon an operation state of the user (for example, presence or absence of a side switch, presence or absence of an expansion function hereinafter described) and information of an identification (ID) indicative of a unique number of the stylus or the like is included. The first pen signal P1 is a signal for transmitting data that varies depending upon an operation state of the stylus such as an operation state such as the position or the writing pressure of the first stylus 110.

The first communication circuit 111 receives a first control signal C1_U (search signal DS) transmitted from the sensor controller 300. The first control signal C1_U is a signal corresponding to the search signal DS in the first embodiment. The search signal DS in the present embodiment is configured in such a form that a control command CMD is connected to a search pattern DP. The control command CMD is a control signal that requests the stylus 100 to transmit function information FD included in a response signal ACK or designates a timing to the stylus 100 at which operation state information based on a function (writing pressure information or expansion information hereinafter described) is to be transmitted.

The electrode 101 is an electrode that is used by the first stylus 110 to transmit a first pen signal P1 and receive a first control signal C1_U (search signal DS).

The electronic apparatus 3 is configured including an electronic apparatus controlling circuit 351, a sensor 201, and a first sensor controller 310. The electronic apparatus control circuit 351 is a control circuit for controlling the entire electronic apparatus 3 to operate, and accepts an input of pen data generated by the first sensor controller 310 through a bus such as an inter-integrated circuit (I2C) or universal serial bus (USB) and performs information processing for causing a position indicated by the stylus 100 to be displayed on a screen image on the basis of information of a coordinate position, a writing pressure value and so forth included in the pen data.

The sensor 201 is an electrode group formed in a matrix, for example, on an operation face of the electronic apparatus 3 as described hereinabove with reference to FIG. 3. Upon reception of a signal transmitted from the first stylus 110 (response signal ACK, first pen signal P1 or the like), the sensor 201 supplies a signal corresponding to the received signal to the first sensor controller 310 using charge induced in the electrode group in response to the received signal or in the form of current or a voltage. Further, when a signal (search signal DS (first control signal C1_U) or the like) is to be transmitted from the first sensor controller 310, charge corresponding to a transmission signal is induced in the electrode group of the sensor such that a signal is supplied in the form of a variation of the potential or electric field to the first communication circuit 111 of the first stylus.

The first sensor controller 310 is a kind of sensor controller 300 and can perform communication only with a stylus 100 that performs at least the first communication method such as the first stylus 110 or the dual mode stylus 130. The first sensor controller 310 is configured including a first communication circuit 311 and a control circuit 340 as depicted in FIG. 9A.

The first communication circuit 311 performs a bidirectional communication process according to the first communication method. In particular, the first communication circuit 311 receives a first pen signal P1 from the first communication circuit 111 of the first stylus 110 and performs a process for deriving an indicated position of the first stylus 110 from the received position of the electrode and value of the level of a reception signal and so forth and further performs a process for sending out a first control signal C1_U (search signal DS) through the electrode of the sensor 201. The first communication circuit 311 performs bidirectional communication with the first communication circuit 111 of the first stylus 110 in this manner.

The control circuit 340 performs a discovery process for searching for a first stylus 110 or the like utilizing the communication functions of the first communication circuit 311 and a mode determination process based on a result of the discovery process.

Figure 9B:
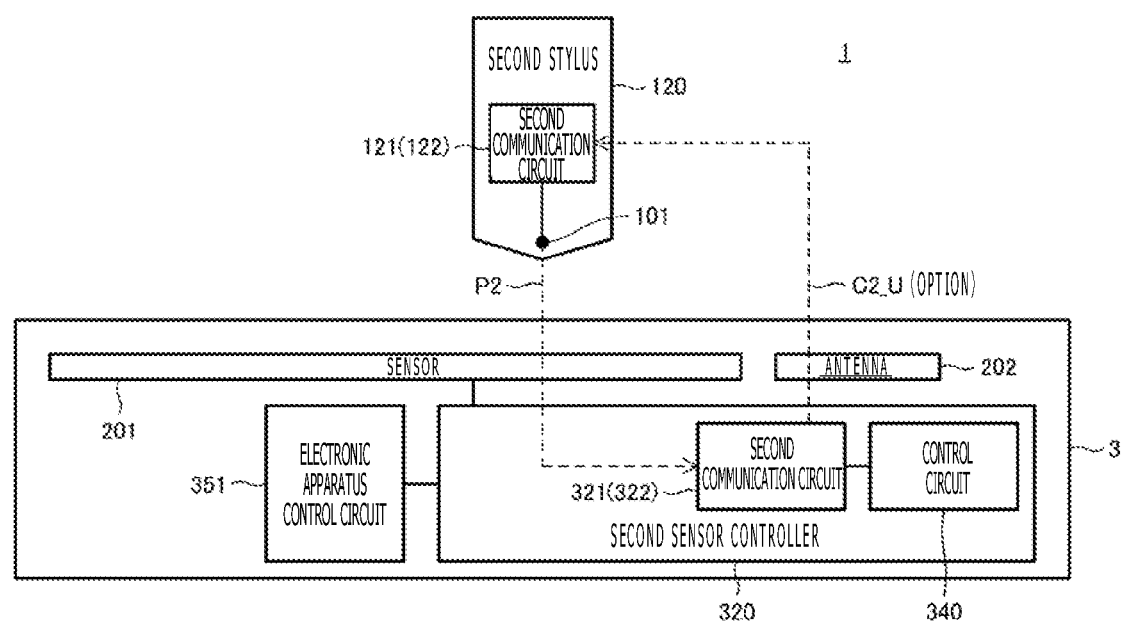
FIG. 9B is an overview figure depicting an example of the communication system 1 that performs a second communication method, according to one or more embodiments of the present disclosure.

FIG. 9B is an overview figure depicting an example of the communication system 1 that performs the second communication method. The communication system 1 of FIG. 9B is configured including a second stylus 120 and a second sensor controller 320. In FIG. 9B, like elements denoted by the same reference symbols to those in FIG. 9A are similar to those described hereinabove with reference to FIG. 9A. The second stylus 120 and the second sensor controller 320 correspond to the second stylus 120 and the second sensor controller 320 according to the first embodiment depicted in FIG. 6A, respectively.

The second stylus 120 is a kind of capacitive stylus of the active type and performs communication by the second communication method different from the first communication method with the second sensor controller 320. The second stylus 120 cannot perform communication that complies with the first communication method. The second stylus 120 is configured including one of a second communication circuit 121 and a second communication circuit 122 and an electrode 101. As depicted in FIG. 11, although, as the second stylus 120, a second stylus including the second communication circuit 121 and another second stylus including the second communication circuit 122 are available, in the present embodiment, they are collectively referred to as second stylus 120.

The second communication circuit 121 is a communication circuit that performs communication in compliance with the 2-1st communication method that is one of the second communication methods, and the second communication circuit 122 is a communication circuit that performs communication in compliance with the 2-2nd communication method that is another one of the second communication methods. It is to be noted that the term "second communication method" signifies a communication method different from the first communication method and is used to collectively refer to the 2-1st communication method and the 2-2nd communication method.

The second communication circuit 121 transmits a second pen signal P2 that indicates a position of the second stylus 120 from the electrode 101. The direction of a broken line arrow mark of the second pen signal P2 indicates that the transmission of the second pen signal P2 is communication in one direction from the second communication circuit 121 toward the second sensor controller 320. It is to be noted that, as depicted in FIG. 9B, the second communication circuit 121 may otherwise be configured such that it can perform reception of a second control signal C2_U from the second sensor controller 320 utilizing, for example, BLUETOOTH® (registered trademark) or some other wireless communication technology or standard.

The electronic apparatus 3 of FIG. 9B is configured including an electronic apparatus controlling circuit 351, a sensor 201, a second sensor controller 320, and an antenna 202.

The second sensor controller 320 is a sensor controller that can perform transmission and reception of a signal to and from the second stylus 120 on the basis of the second communication method from among the sensor controllers 300. The second sensor controller 320 is configured including one of a second communication circuit 321 and a second communication circuit 322 and a control circuit 340. It is to be noted that, although as the second sensor controller 320, a sensor controller in which the second communication circuit 321 is included and another sensor controller in which the second communication circuit 322 is included are available as illustrated also in FIG. 11, in the present embodiment, they are collectively referred to as second sensor controller 320.

The second communication circuit 321 performs communication (signal reception) in compliance with the 2-1st communication method described hereinabove. In particular, the second communication circuit 321 derives an indicated position of the second stylus 120 from the position of the electrode by which the second pen signal P2 is received and the value of the level or the like of the reception signal. It is to be noted that, as an expansion function unique to the 2-1st communication method, not only information of a stylus ID indicative of a unique number of the second stylus 120, a writing pressure value and so forth but also tilt information indicative of an inclination of the stylus or twist information expansion information indicative of a rotation amount around an axis of the stylus are overlapped with the second pen signal P2. The second communication circuit 321 has also a function for extracting and transmitting such expansion information at a designated timing. It is to be noted that the second communication circuit 321 may otherwise be configured such that it can send out a control signal C2_U in a direction indicated by a broken line arrow mark in FIG. 9B through the antenna 202 utilizing, for example, Bluetooth (registered trademark) or another wireless communication technology or standard.

The second communication circuit 322 performs communication (signal reception) in compliance with the 2-2nd communication method described hereinabove.

The control circuit 340 performs a discovery process for detecting the second stylus 120 utilizing the functions of the second communication circuit 321 or the second communication circuit 322 and a mode determination process based on a result of the discovery.

Figure 9C:
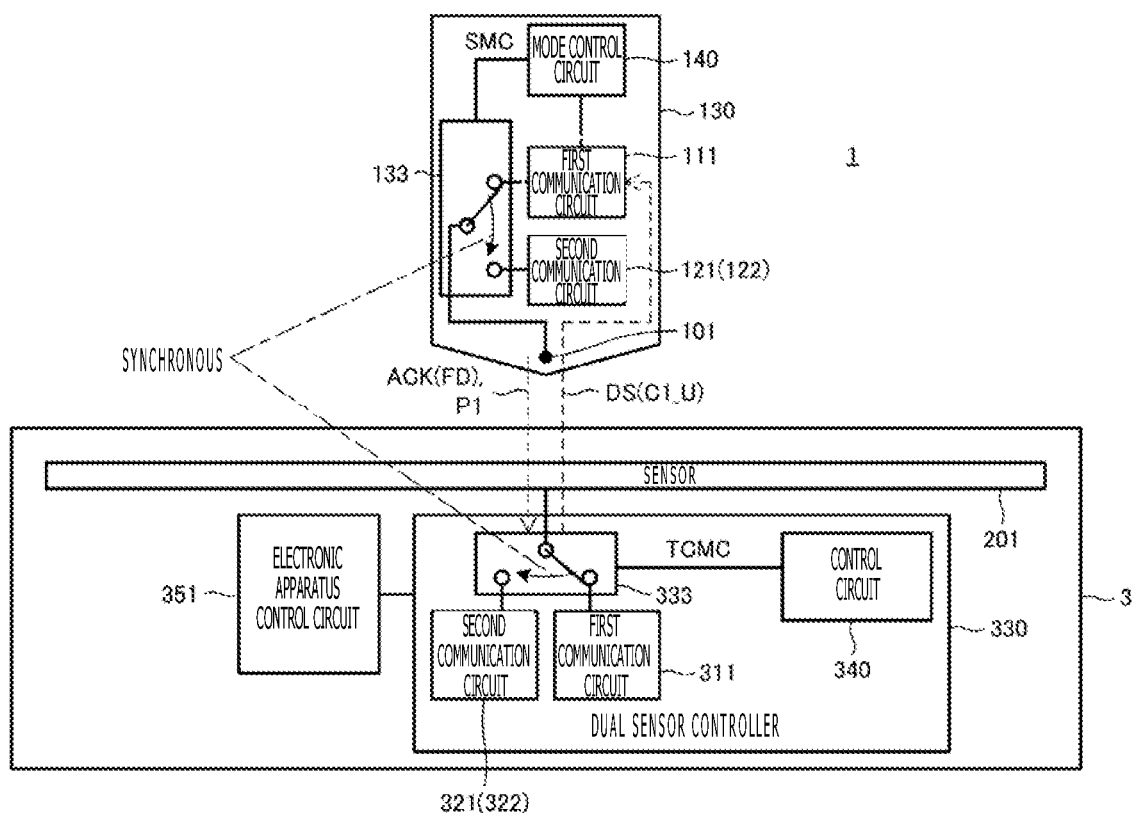
FIG. 9C is an overview figure depicting an example of the communication system 1 that selectively performs one of the first communication method and the second communication method, according to one or more embodiments of the present disclosure.

FIG. 9C is an overview figure of the communication system 1 that selectively performs one of the first communication method and the second communication method. The communication system 1 of FIG. 9C is configured including a dual mode stylus 130 and a dual mode controller 330. The dual mode stylus 130 corresponds to the dual mode stylus 130 according to the first embodiment depicted in FIG. 8A, and the dual mode controller 330 corresponds to the dual mode controller 330 according to the first embodiment depicted in FIG. 7A.

The dual mode stylus 130 is a stylus that can perform communication with the dual mode controller 330 by two communication methods including the first communication method and the second communication method. Although, for the dual mode stylus 130, a stylus in which the second communication circuit 121 is included and another stylus in which the second communication circuit 122 is included are available as depicted in FIG. 11, in the present embodiment, they are collectively referred to as dual mode stylus 130.

The dual mode stylus 130 is configured including a first communication circuit 111, a second communication circuit 121 (or a second communication circuit 122), a switch 133, a mode controlling circuit 140, and an electrode 101. It is to be noted that, in FIG. 9C, like elements denoted by the same reference symbols to those in FIG. 9A or 9B are similar to those described hereinabove with reference to the figures.

The mode controlling circuit 140 issues a stylus mode switching signal SMC that switches the operating mode of the stylus 130 on the basis of an operating mode changing command MCC (hereinafter described) included in a first control signal C1_U (search signal DS). The first control signal C1_U (search signal DS) is generated and transmitted in a discovery process performed by the dual mode controller 330 on the basis of the first communication method bidirectional communication is performed and is received by the first communication circuit 111 in accordance with the first communication method that utilizes capacitive coupling between the stylus and the sensor.

The switch 133 is a switch that switches the connection destination of the electrode 101 between the first communication circuit 111 and the second communication circuit 121 (or the second communication circuit 122) in accordance with a stylus mode switching signal SMC supplied from the mode controlling circuit 140.

The dual mode stylus 130 performs bidirectional communication in accordance with the first communication method with the dual mode controller 330 utilizing the first communication circuit 111. Although a signal to be transmitted from the dual mode stylus 130 by the bidirectional communication method includes a response signal ACK described hereinabove with reference to FIG. 9A, the function information FD included in the response signal ACK in this case includes not only information regarding a function of the first communication circuit 111 but also information of an expansion function by a function of the second communication circuit 121 (or the second communication circuit 122) as mentioned hereinabove.

The expansion function is an expansion function obtained by expanding a function of the first stylus that operates in the first mode (standard function in the first mode) and particularly includes a function of the stylus 100 for acquiring various kinds of information (expansion information) relating to the stylus 100 itself and transmitting the acquired expansion information to the sensor controller 300 in accordance with the first communication method or the second communication method. As a particular example of the expansion information, color information indicative of a color applied to the stylus 100, twist information indicative of a rotation amount of the stylus 100 around the center axis, tilt information indicative of an inclination of the stylus 100 and so forth can be listed in addition to a stylus ID described hereinabove. The expansion information may be transmitted in the format of a flag including a flag indicative of which one of the various kinds of expansion information listed above is supported by the stylus 100 (whether or not each expansion function can be executed).

The electronic apparatus 3 of FIG. 9C is configured including an electronic apparatus controlling circuit 351, a sensor 201, and a dual mode controller 330. The dual mode controller 330 is a sensor controller capable of utilizing two communication methods including the first communication method and the second communication method, and is configured including a first communication circuit 311, one of a second communication circuit 321 and a second communication circuit 322, a switch 333, and a control circuit 340. It is to be noted that, as depicted also in FIG. 11, as the dual mode controller 330, a type that includes the second communication circuit 321 and another type that includes the second communication circuit 322 are available, in the present embodiment, they are collectively referred to as dual mode controller 330.

A search signal DS (first control signal C1_U) transmitted by the first communication circuit 311 of the dual mode controller 330 includes, in addition to a response request signal or the like described hereinabove as the control command CMD, an operating mode changing command MCC for instructing transmission of expansion information to the dual mode stylus 130 as another control command CMD. A method of use of the operating mode changing command MCC is hereinafter described.

The control circuit 340 performs a discovery process for searching for the first stylus 110, the second stylus 120, or the dual mode stylus 130 and a mode determination process based on a result of the discovery process utilizing the communication function of the first communication circuit 311 and the second communication circuit 321 (or the second communication circuit 322). Further, the control circuit 340 generates, for example, a sensor controller switching signal TCMC for switching the switch 333 in response to a result of the mode determination process.

The switch 333 switches the connection destination of the sensor 201 between the first communication circuit 311 and the second communication circuit 321 (or the second communication circuit 322) in accordance with a sensor controller switching signal TCMC.

Here, that the switch 133 and the switch 333 are tied with a dash-dotted line with "synchronous" added thereto in FIG. 9C signifies that the switch 133 and the switch 333 are switched in synchronism with each other. In particular, the internal state of the dual mode stylus 130 and the internal state of the dual mode controller 330 are switched in synchronism with each other by a mode determination process based on a result of a discovery hereinafter described. For example, if it is determined that the second communication method (including an expansion function expanded from that of the first communication method) is to be used by a mode determination process, then the switch 133 is switched to the second communication circuit 121 (or the second communication circuit 122) side and the switch 333 is switched to the second communication circuit 321 (or the second communication circuit 322) side at a synchronized timing. Consequently, the dual mode stylus 130 and the dual mode controller 330 can cooperatively start utilization of the second communication method at the same timing. This similarly applied also to a case in which utilization of the first communication method is to be started.

Figure 10:
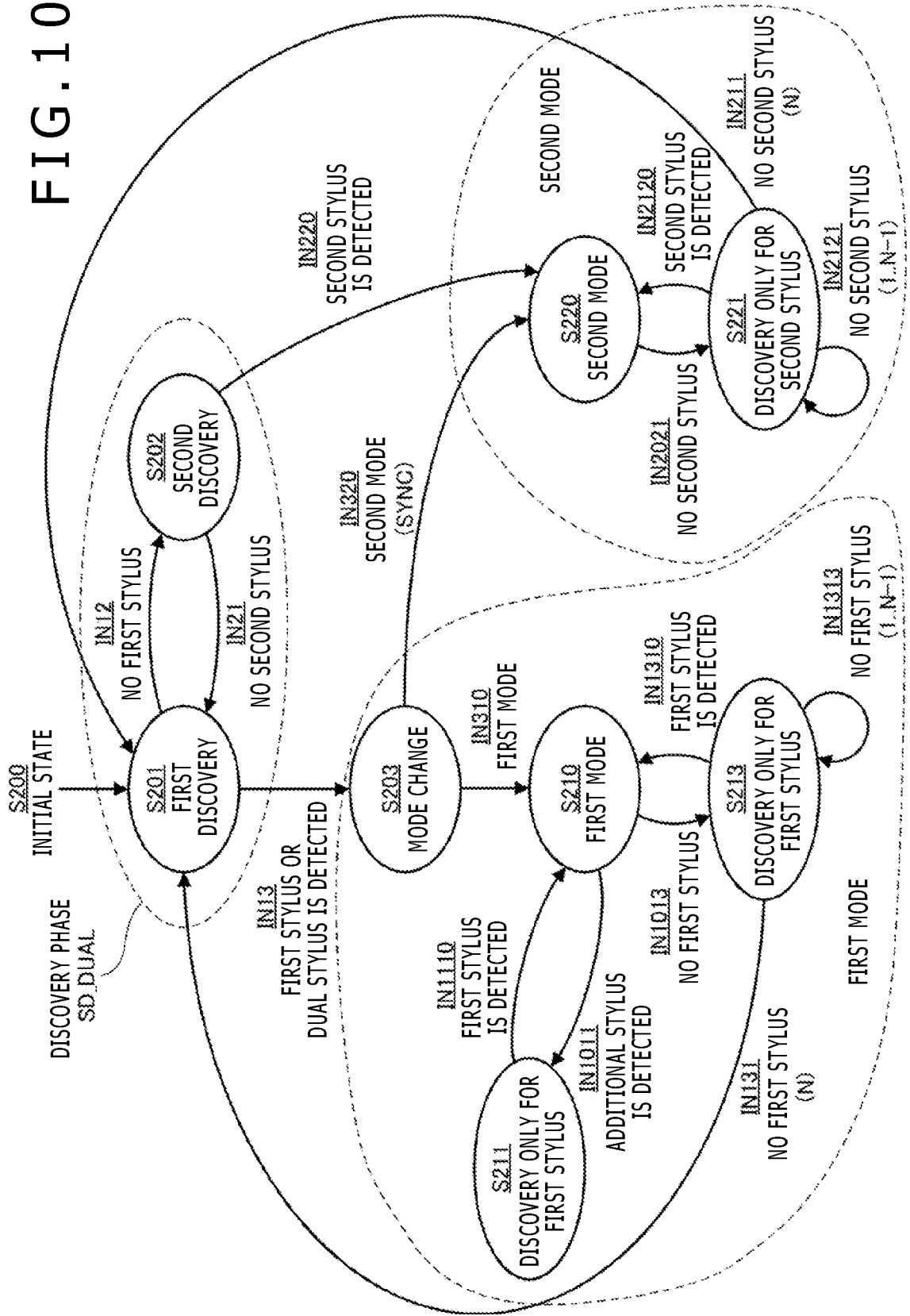
FIG. 10 is a state transition diagram of the dual mode controller 330, according to one or more embodiments of the present disclosure.

FIG. 10 is a state transition diagram of the dual mode controller 330 illustrating discovery and a mode determination process. FIG. 10 corresponds to the state transition diagram of FIG. 7B in the first embodiment.

The dual mode controller 330 first enters a discovery phase from an initial state S200. The discovery phase is a phase for discovering a stylus 100, and in this phase, the dual mode controller 330 operates in the dual mode discovery state SD_DUAL and alternately and repetitively performs a first discovery process (state S201) for searching for a stylus 100 that performs the first communication method and a second discovery process (state S202) for searching for a stylus 100 that performs the second communication method. Details are hereinafter described.

<1. Discovery Phase>

First, in the state S201, the dual mode controller 330 performs the first discovery process for searching for a stylus 100 that performs the first communication method. The "stylus 100 that operates in the first communication method" here includes two types including a first stylus 110 that performs only the first communication method and a dual mode stylus 130 that performs the first communication method and the second communication method.

The search of the first discovery process is performed using the first communication circuit 311 that utilizes the first communication method by which bidirectional communication is performed. The control circuit 340 detects a response signal ACK or a first pen signal P1 transmitted from the stylus 100 in response to a first control signal C1_U (search signal DS) sent out from the dual mode controller 330 toward the stylus 100 or autonomously to detect the presence or absence of a first stylus 110 or a dual mode stylus 130.

Further, if a dual mode stylus 130 is detected as a stylus 100, then the dual mode controller 330 acquires a type of the second communication method (the 2-1st communication method or the 2-2nd communication method) supported by the dual mode stylus 130 and an expansion function of the second communication method from function information FD included in a response signal ACK transmitted from the dual mode stylus 130. It is to be noted that, if a type of the second communication method and an expansion function of the same are described in the function information FD included in the received response signal ACK, then the dual mode controller 330 may decide that the stylus 100 from which the function information FD is transmitted is not a first stylus 110 but a dual mode stylus 130 and handle the stylus 100 as a dual mode stylus 130 in a later process.

If no stylus 100 is detected in the state S201, then the state of the dual mode controller 330 transitions to the state S202 (IN12).

In the state S202, the dual mode controller 330 performs the second discovery process in order to search for a second stylus 120 that complies with the second communication method, namely, a stylus 100 that operates in the second communication circuit 321 or the second communication circuit 322. It is to be noted that the search for a stylus 100 in the second discovery process is preferably performed, for example, on the basis of whether or not the second communication circuit 321 (or the second communication circuit 322) receives a second pen signal P2.

If the second stylus 120 is not detected in the state S202, then the state of the dual mode controller 330 returns to the state S201 (IN21), and the first discovery process is performed again.

In this manner, in the discovery phase, the first discovery process for searching for the first stylus 110 and the dual mode stylus 130 individually that performs the first communication method and the second discovery process for searching for the second stylus 120 are continuously performed alternately and repetitively. As long as none of the first stylus 110, the second stylus 120, and the dual mode stylus 130 is detected, the discovery phase is continued.

<2. When Second Stylus 120 is Detected>

If the second stylus 120 that performs the communication method of the second communication circuit 321 or the second communication circuit 322 is detected in the state S202 (IN220), then the state of the sensor controller 300 transitions to a state S220.

The state S220 is a state in which the dual mode controller 330 and the stylus 100 individually operate in the second mode and perform communication in accordance with the second communication method. After the dual mode controller 330 starts operating in the second mode once, the dual mode controller 330 continues, for a fixed period since then, discovery only for the second stylus which is a search process specialized for operation in the second mode in compliance with the second communication method or for the second communication method.

If the dual mode controller 330 that is acting in the second mode (state S220) no longer detects the second stylus 120, then the state of the dual mode controller 330 transitions to a state S221 in which only the second stylus 120 is continuously searched for a predetermined period (for example, 10 seconds, for example, by N times or the like) (IN2021).

The state S221 is a state in which the sensor controller 300 performs the discovery process only for the second stylus. The discovery process only for the second stylus is a search process specialized for the second communication method, and the stylus 100 that performs the first communication method (including the dual mode stylus 130) is placed out of a target of detection. As a general usage form of a stylus 100, the user would space and keep, for a period of time until, every time one stroke from a pen-down operation U1 to a pen-up operation U4 comes to an end, a next stroke is started, the stylus 100 away from the sensor 201 once. The state S221 is provided assuming such a case as just described, and under the assumption that, after the second stylus 120 is detected once, the possibility that the stylus 100 detected again may be the second stylus 120 is high, search specialized for the second stylus 120 is performed.

In this manner, in the present embodiment, the search time period in accordance with the first communication method is not provided in the discovery process only for the second stylus, and the discovery process only for the second stylus specialized for detection of the second stylus 120 is performed repetitively (IN2121). As a result, if the second stylus 120 is not detected, for example, even by N times of search, then the sensor controller 200 cancels the operating state in the second mode and returns to the state S201 in the discovery phase (IN211). Consequently, when the second stylus 120 is utilized successively with separations of a short period of time interposed therein, the speed (response speed) of detection of the second stylus 120 can be improved in many cases.

If the second stylus 120 is detected again in the state S221, then the dual mode controller 330 returns to the state S220 (IN2120) and keeps and continues the operating in the second mode.

<3. When Stylus 100 that Performs First Communication Method is Detected>

If a first stylus 110 or a dual mode stylus 130 is detected as a result of performance of the first discovery process in the state S201 in the discovery phase, then the state of the dual mode controller 330 transitions to a state S203 (IN13).

In the state S203, the dual mode controller 330 performs a mode determination process for determining an operating mode on the basis of the type of a stylus 100 and the type of a dual mode controller 330 detected by the first discovery process.

<3A. When First Stylus 110 is Detected>

If a first stylus 110 is detected in the first discovery process, then the dual mode controller 330 in the state S203 determines the operating mode as the first mode and causes the state of the dual mode controller 330 itself to transition to a state S210 (IN310).

In the state S210, the dual mode controller 330 performs operations in the first mode based on the first communication method. In the first mode, the dual mode controller 330 tries to maintain an operation specialized for the first communication method (function for additional stylus search, search for a stylus or the like) such as paring with the first stylus 110.

In particular, when the dual mode controller 330 is to cope with simultaneous usage of a plurality of first styluses 110, the dual mode controller 330 causes its own state to transition to a state S211 (IN1011).

In the state S211, the dual mode controller 330 performs a discovery process only for the first stylus in order to search for an additional first stylus 110. This process is a process for searching for an additional first stylus 110 in addition to the first stylus 110 detected already. If an additional first stylus 110 is detected in the state S211, then the state of the dual mode controller 330 returns to a state 210 in which a plurality of additional first styluses 110 can be detected (IN1110).

If, in the state S210, the dual mode controller 330 no longer detects one first stylus 110, then the dual mode controller 330 transitions to a state S213 in which it performs a process for successively processing detection of the first stylus 110 for a predetermined period (for example, 10 seconds, N times or the like) (IN1013).

In the state S213, the dual mode controller 330 that is currently operating in the first mode performs the discovery process only for the first stylus in order to determine whether or not the dual mode controller 330 is to continue the operating in the first mode. Unless a first stylus 110 is discovered, the dual mode controller 330 repetitively performs the discovery process only for the first stylus by N−1 times (N is equal to or higher than 2) in the maximum (IN1313), and if a first stylus 110 is detected in one of the searches, then the dual mode controller 330 returns to the first mode indicated in the state S210 (IN1310).

On the other hand, if no first stylus 110 can be detected even by N−1 times of the discovery process only for the first stylus, then the dual mode controller 330 cancels the operation in the first mode and returns the state S201 in the discovery phase (IN131). Thereafter, the dual mode controller 330 starts alternate search processes for the first discovery process and the second discovery process in the discovery phase again.

<3B. When Dual Mode Stylus 130 is Detected>

On the other hand, if the dual mode stylus 130 is detected by the first discovery process, then the dual mode controller 330 refers to the function information FD included in the response signal ACK transmitted from the detected dual mode stylus 130 to decide whether or not the second communication method (or the expansion function) supported by the dual mode controller 330 itself and the second communication method (expansion function) supported by the detected dual mode stylus 130 conform to each other.

(a) When the Second Communication Methods do not Conform to Each Other

For example, if the stylus 100 detected by the discovery is the dual mode stylus 130 that performs the 2-1st communication method and the dual mode controller 330 does not include the second communication circuit 321 that performs the 2-1st communication method, then the dual mode controller 330 determines that its own operating mode is the first mode, and the state of the dual mode controller 330 transitions to the state S210 in which the first mode conforming to the first communication method is performed (IN310). Thereafter, communication in accordance with the first communication method is performed with the detected dual mode stylus 130.

(b) When the Second Communication Methods Conform to Each Other

For example, if the stylus 100 detected by the discovery process is the dual mode stylus 130 that performs the 2-1st communication method and the dual mode controller 330 includes the second communication circuit 321 that performs the 2-1st communication method (expansion function), then the dual mode controller 330 performs a selection process and determines whether (i) the dual mode stylus 130 and the dual mode controller 330 are to continuously act in the first mode or (ii) the dual mode stylus 130 and the dual mode controller 330 are to cooperate with each other to perform switching to the second mode.

In this selection process, it is possible to arbitrarily determine whether the first communication method is to be set or the second communication method is to be set as the communication method between the dual mode stylus 130 and the dual mode controller 330. However, in any case, it is necessary that the operating mode of the dual mode stylus 130 and the operating mode of the dual mode controller 330 coincide with each other. Accordingly, in order to make the operating modes of the dual mode stylus 130 and the dual mode controller 330 coincide with each other, the following process is performed.

(i) When the First Mode is Used:

Since the dual mode controller 330 has just carried out the first discovery process in the state S201, it is currently operating in the first mode. Accordingly, the dual mode controller 330 in this case maintains the first mode as its operating mode as it is. Further, the dual mode controller 330 does not issue an operating mode changing command MCC to the dual mode stylus 130. Here, the dual mode stylus 130 is configured such that it operates in the first mode unless it receives an operating mode changing command MCC. Accordingly, both the dual mode controller 330 and the dual mode stylus 130 continue to operate in the first mode in which the first communication method is performed.

Figure 12A:
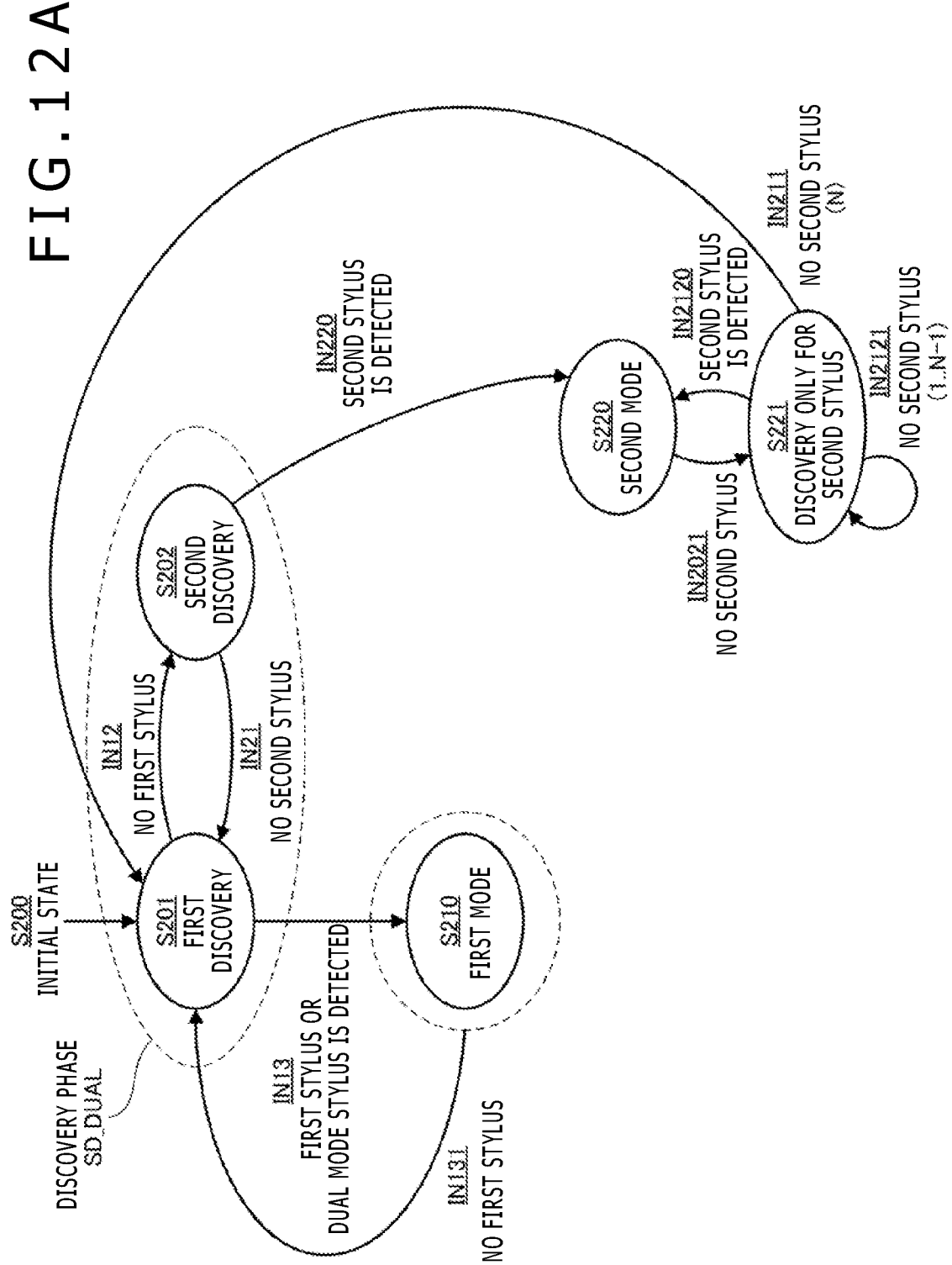
FIG. 12A is a state transition diagram of the dual mode controller 330 according to an example in which the first mode is selected fixedly, according to one or more embodiments of the present disclosure.

Here, the dual mode controller 330 may otherwise use the first mode fixedly when the dual mode stylus 130 is detected. FIG. 12A depicts a state transition diagram of the dual mode controller 330 in this case. In FIG. 12A, the selection process in mode change in the state S203 illustrated in FIG. 10 is omitted.

(ii) When the Second Mode is Used:

If the dual mode controller 330 determines to switch its own operating mode to the second mode, then it causes its own state to transition to the state S220 in which the second mode conforming to the second communication method (or reception of an expansion function) is performed (IN320).

At this point of time, the dual mode stylus 130 side is operating in the first mode in which the first communication method is performed. Accordingly, it is necessary also for the dual mode stylus 130 to cooperate to perform a process that switches the communication method from the first communication method to the second communication method ("synchronous" indicated in FIG. 9C). Thus, the dual mode controller 330 issues a first control signal C1_U (search signal DS) including an operating mode changing command MCC to instruct the dual mode stylus 130 to switch to the second mode (or to a mode in which the expansion function is utilized). The dual mode stylus 130 changes its own operating mode illustrated in FIG. 9C to an operating mode in which the second communication circuit 121 (or the second communication circuit 122) is utilized on the basis of the operating mode changing command MCC. At this time, also on the dual mode controller 330 side, the switch 333 is switched to the second communication circuit 321 (or the second communication circuit 322) side simultaneously. Consequently, both the dual mode controller 330 and the dual mode stylus 130 enter the second mode, and thereafter, communication in compliance with the second communication method is performed.

In this manner, in any of the cases of (i) and (ii), the dual mode controller 330 and the dual mode stylus 130 can cooperatively operate in the same operating mode.

It is to be noted that, also after change from the first mode to the second mode is performed, the dual mode stylus 130 may intermittently return to the first mode in which communication by the first communication circuit 111 is performed at predetermined timings. Since basically the sensor controller 300 does not instruct the dual mode stylus 130 to switch from the second mode to the first mode, the dual mode stylus 130 that enters the second mode once cannot get a chance to return to the first mode. Accordingly, even in the case where communication with the first sensor controller 310 that operates only in the first mode becomes necessary after the second mode is entered, the dual mode stylus 130 cannot return to the first mode and cannot start communication with the first sensor controller 310. By configuring the dual mode stylus 130 such that it intermittently returns to the first mode at predetermined timings as described above, it is possible to provide the dual mode stylus 130 with a chance to return to the first mode. Accordingly, in such a case as described above, communication with the first sensor controller 310 can be started.

Further, as another method for preventing such a situation that, after the dual mode stylus 130 transitions to the second mode once, it cannot return to the first mode and cannot bidirectionally communicate in the first mode, an expansion mode in which the expansion function is utilized while communication itself between the first communication circuits 111 and 311 is continued as the first communication mode may be utilized.

Figure 12B:
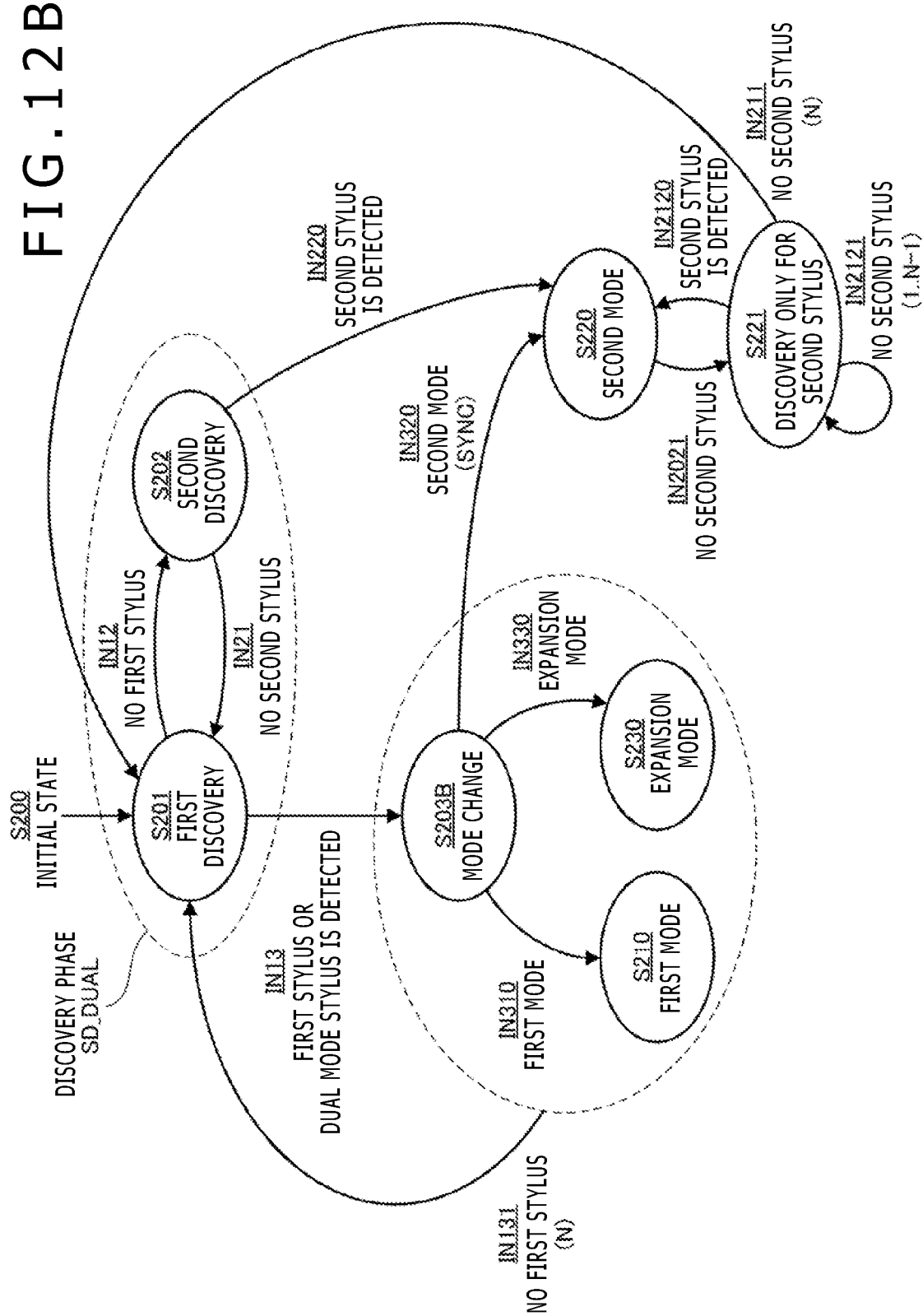
FIG. 12B is a state transition diagram of the dual mode controller 330 according to an example in which an expansion mode is utilized, according to one or more embodiments of the present disclosure.

FIG. 12B is a state transition diagram of the dual mode controller 330 according to an example that utilizes the expansion mode. The difference from the state transition diagram of FIG. 10 is that the state S203 of FIG. 10 is replaced by a state S203B in FIG. 12B. In the state S203B, an expansion mode (state S230) that utilizes expansion information provided by the expansion function of the second communication method while the communication function of the first communication method that utilizes bidirectional communication remains used is provided as a transition destination in addition to the two transition destinations of the state S203 (states S210 and S220). The dual mode controller 330 decides whether or not the expansion function indicated by the function information FD received in the first discovery process (expansion function the stylus 100 has) conforms to the expansion function the dual mode controller 330 itself has. If a decision result that the expansion functions conform to each other is obtained, then the dual mode controller 330 can cause its own operating state to transition from the state S203B to the state 230 while the dual mode controller 330 remains utilizing communication in accordance with the first communication method (IN330). The dual mode controller 330, when a decision result that the expansion functions do not conform to each other, may transition to the state S210 and operate in the ordinary first mode (IN310). It is to be noted that, even where a decision result that the expansion functions conform to each other, naturally the dual mode controller 330 may transition to the state S210 and operate in the ordinary first mode.

By utilizing this expansion mode, the dual mode controller 330 can continue to utilize bidirectional communication based on the first communication method even after it transitions to the state S230. Therefore, it is possible to execute provision of function information FD performed by the first discovery process or instruction from the dual mode controller 330 to the dual mode stylus 130 to return to the first mode (transmission of a command for instruction from the dual mode controller 330 to the dual mode stylus 130 to return to the first mode) and so forth. It is to be noted that, also in this case, an operating mode changing command MCC is issued from the dual mode controller 330 to the dual mode stylus, and the dual mode stylus 130 changes its own mode to the expansion mode in response to the operating mode changing command MCC.

The operating mode changing command MCC in this case is a command for instructing the dual mode stylus 130 to transmit expansion information. It is to be noted that the operating mode changing command MCC includes, in addition to a transmission timing of a first pen signal P1 including a writing pressure and so forth to be transmitted in the first mode from the dual mode stylus 130, a timing at which the dual mode stylus 130 is to transmit expansion information (tilt information indicative of an inclination of the dual mode stylus 130, twist information indicative of an amount of rotation of the dual mode stylus 130 or the like).

Then, the dual mode controller 330 receives the expansion information transmitted at the timing while using the first communication method. It is to be noted that, where the dual mode stylus 130 includes the expansion function, the dual mode controller 330 issues a command that designates a timing at which expansion information such as tilt information is to be transmitted as the operating mode changing command MCC. The dual mode stylus 130 transmits the expansion information at the designated timing, and the dual mode controller 330 receives the expansion information at the designated timing.

By doing so, the dual stylus 130 and the dual mode controller 330 can transmit and receive expansion information such as tilt information while utilizing the first communication method.

In this manner, the control circuit 340 of the dual mode controller 330 can perform discovery processes that searches for the first stylus 110, the second stylus 120, or the dual mode stylus 130 utilizing the communication function of the first communication circuit 311, the second communication circuit 321 and so forth and can execute a mode determination process that determines an operating mode of each of the dual mode controller 330 and the stylus 100 on the basis of the detected type of the stylus 100 and the type of the first communication circuit 311, the second communication circuit 321, and the second communication circuit 322 provided in the dual mode controller 330.

Especially, the function information FD received from the dual mode stylus 130 utilizing the first communication circuit 311 includes not only information regarding a function of the first communication circuit 111 but information relating to an expansion function (type information and so forth of a supported sensor) obtained by expansion a function of the first communication circuit 131 or depending upon a function of the second communication circuit 121 (or the second communication circuit 122). Accordingly, when the stylus 100 is a dual mode stylus 130, even if the second communication method is a communication method by which information like the function information FD is not supplied, the dual mode controller 330 can acquire information of the second communication method provided in the dual mode stylus 130 (information of the expansion function that utilizes the second communication method) while it performs the first discovery process in accordance with the first communication method, and can select, on the basis of a result of the acquisition, which one of the first communication method and the second communication method is to be set as the communication method to be used for communication with the dual mode stylus 130.

Further, when it is selected to utilize the second communication method between the dual mode controller 330 and the dual mode stylus 130, the dual mode controller 330 issues a first control signal C1_U (search signal DS) including an operating mode changing command MCC to the dual mode stylus 130 while switching the internal operating state so as to utilize the second communication circuit. Accordingly, the dual mode stylus 130 can perform, by performing a switching process for its own inside on the basis of the received operating mode changing command MCC in the first control signal C1_U (search signal DS), a switching process of the operating mode from the first mode to the second mode (or the expansion mode) in synchronism with an operating mode change of the dual mode controller 330 (refer to a dash-dotted line "synchronous" of FIG. 9C).

It is to be noted that, in the selection process described above, the dual mode controller 330 may send out a mode selection request signal that requests activation of a user interface that enables a user to select whether the first communication method is to be utilized or the second communication method by which an expansion function can be utilized is to be utilized to the electronic apparatus controlling circuit 351. By doing this, selection of a communication method by the user is made possible.

FIG. 11 is a table indicating correspondence relationships between respective types of the stylus 100 and the sensor controller 300 and communication methods between them. In FIG. 11, five columns indicate types of the sensor controller 300 that perform discovery processes. Meanwhile, five rows indicate types of the stylus 100. In the following, the discovery processes and the mode determination processes described hereinabove are described with reference to FIG. 11 collectively from the point of view of the second embodiment again.

<Column 1: Where Sensor Controller 300 is First Sensor Controller 310>

The fields E11 to E51 indicate communication methods where the sensor controller 300 is the first sensor controller 310. As can be recognized from FIG. 9A, the first sensor controller 310 includes a first communication circuit 311 that complies with the first communication method while it does not include the second communication circuits 321 and 322 that comply with the second communication method. Accordingly, the first sensor controller 310 can communicate with the first stylus 110 using the first communication method (field E11) while it cannot communicate with the second stylus 120 (fields E21 and E31). Further, for communication with the dual mode stylus 130, the first communication method is used irrespective of which one of the second communication circuit 121 and the second communication circuit 122 the dual mode stylus 130 includes (fields E41 and E51).

<Column 2: Where Sensor Controller 300 is Second Sensor Controller 320 Having Second Communication Circuit 321>

The fields E12 to E52 indicate communication methods where the sensor controller 300 is the second sensor controller 320 and has the second communication circuit 321 that performs the 2-1st communication method. As can be recognized from FIG. 9B, the second sensor controller 320 does not include the first communication circuit 311 that complies with the first communication method. Accordingly, the second sensor controller 320 cannot communicate with the first stylus 110 (field E12). Further, since the second sensor controller 320 described here does not include the second communication circuit 322, the second sensor controller 320 cannot communicate with any of the second stylus 120 that has only the second communication circuit 122 and the dual mode stylus 130 that has only the first communication circuit 111 and the second communication circuit 122 (fields E32 and E52). Meanwhile, the second sensor controller 320 can communicate with the second stylus 120 having the second communication circuit 121 and the dual mode stylus 130 having the first communication circuit 111 and the second communication circuit 121 using the 2-1st communication method (fields E22 and E42).

<Column 3: Where Sensor Controller 300 is Second Sensor Controller 320 Having Second Communication Circuit 322>

The fields E13 to E53 indicate communication methods where the sensor controller 300 is the second sensor controller 320 and has the second communication circuit 322 that performs the 2-2nd communication method. Also in this case, the second sensor controller 320 does not include the first communication circuit 311 that complies with the first communication method similarly as in the case of the column 2. Accordingly, the second sensor controller 320 cannot communicate with the first stylus 110 (field E13). Further, since the second sensor controller 320 described here does not include the second communication circuit 321, it cannot communicate with any of the second stylus 120 that has only the second communication circuit 121 and the dual mode stylus 130 that has only the first communication circuit 111 and the second communication circuit 121 (fields E23 and E43). On the other hand, the second sensor controller 320 can communicate with the second stylus 120 having the second communication circuit 122 and the dual mode stylus 130 having the first communication circuit 111 and the second communication circuit 122 using the 2-2nd communication method (fields E33 and E53).

Here, in the cases corresponding to the fields E42 and E53, since the second sensor controller 320 does not have the issuing function of an operating mode changing command MCC, a scheme for causing the dual mode stylus 130 to transition to the second mode is required. This matter is hereinafter described in detail with FIG. 14 referred to.

<Column 4: Where Sensor Controller 300 is Dual Mode Controller 330 Having Second Communication Circuit 321>

The fields E14 to E54 indicate communication methods where the sensor controller 300 is the dual mode controller 330 and has the second communication circuit 321 that performs the 2-1st communication method. The communication method in this case is determined by a mode determination process executed by the control circuit 340 depicted in FIG. 9C.

(E14) when the First Stylus 110 is Utilized

The first stylus 110 is detected by the first discovery process in the state S201 depicted in FIG. 10, and it is determined that the operating mode is the first mode in the state S203 (IN310). Accordingly, communication between the first stylus 110 and the dual mode controller 330 is performed using the first communication method.

(E24) when the Second Stylus 120 Having the Second Communication Circuit 121 is Utilized Since the second stylus 120 has the second communication circuit 121 that conforms to the second communication circuit 321 provided in the dual mode controller 330, the second stylus 120 is detected by the second discovery process in the state S202 illustrated in FIG. 10. Accordingly, the operating mode of the sensor controller 300 becomes the second mode (IN220), and communication between the second stylus 120 and the dual mode controller 330 is performed using the 2-1st communication method and the second communication circuit 321.

(E34) when the Second Stylus 120 Having the Second Communication Circuit 122 is Utilized Since the second stylus 120 does not have the second communication circuit 121 conforming to the second communication circuit 321 provided in the dual mode controller 330, the second stylus 120 is not detected even by the second discovery process in the state S202 depicted in FIG. 10. Accordingly, the state S201 and the state S202 are only repeated alternately, but communication between the second stylus 120 and the dual mode controller 330 is not performed.

(E44) when the Dual Mode Stylus 130 Having the Second Communication Circuit 121 is Utilized The dual mode controller 330 detects the dual mode stylus 130 in the first discovery process performed in the state S201 depicted in FIG. 10. Then, in the state S203 after transition, the dual mode controller 330 decides whether or not the second communication method supported by the dual mode controller 330 itself and the second communication method supported by the detected dual mode stylus 130 conform to each other. In this case, since the 2-1st communication method is supported by both of them, a decision result that both of them conform to each other is obtained, and therefore, the above described selection process is executed further. Consequently, one of the first and second modes is selected.

If the result of the selection is the second mode, then the dual mode controller 330 transitions to the state S220 (IN320) and starts operating in the second mode. Further, the dual mode controller 330 issues an operating mode changing command MCC to the dual mode stylus 130, and also the dual mode stylus 130 receiving this starts operating in the second mode. Accordingly, in this case, communication between the dual mode stylus 130 and the dual mode controller 330 is performed using the 2-1st communication method and the second communication circuit 321.

On the other hand, if the result of the selection is the first mode, then the dual mode controller 330 transitions to the state S210 (IN310) and starts operating in the first mode. Since the dual mode stylus 130 is originally operating in the first mode, in this case, issuance of an operating mode changing command MCC is unnecessary. Accordingly, in this case, communication between the dual mode stylus 130 and the dual mode controller 330 is performed using the first communication method.

(E54) when the Dual Mode Stylus 130 Having the Second Communication Circuit 122 is Utilized The dual mode controller 330 detects the dual mode stylus 130 in the first discovery process performed in the state S201 depicted in FIG. 10. Then, in the state S203 after transition, the dual mode controller 330 decides whether or not the second communication method supported by the dual mode controller 330 itself and the second communication method supported by the detected dual mode stylus 130 conform to each other. In this case, since the second communication method supported by the dual mode controller 330 is the 2-1st communication method and the second communication method supported by the dual mode stylus 130 is the 2-2nd communication method, a decision result that they do not conform to each other is obtained. Accordingly, the dual mode controller 330 transitions to the state S210 (IN310) and starts operating in the first mode, and communication between the dual mode stylus 130 and the dual mode controller 330 is performed using the first communication method.

<Column 5: Where Sensor Controller 300 is Dual Mode Controller 330 Having Second Communication Circuit 322>

The fields E15 to E55 indicate communication methods where the sensor controller 300 is the dual mode controller 330 and has the second communication circuit 322 that performs the 2-2nd communication method. Also the communication method in this case is determined by a mode determination process performed by the control circuit 340 depicted in FIG. 9C.

(E15) when the First Stylus 110 is Utilized

The first stylus 110 is detected by the first discovery process in the state S201 depicted in FIG. 10, and it is determined that the operating mode is the first mode in the state S203 (IN310). Accordingly, communication between the first stylus 110 and the dual mode controller 330 is performed using the first communication method.

(E25) when the Second Stylus 120 Having the Second Communication Circuit 121 is Utilized Since the second stylus 120 does not have the second communication circuit 122 that conforms to the second communication circuit 322 provided in the dual mode controller 330, the second stylus 120 is not detected also by the second discovery process in the state S202 depicted in FIG. 10. Accordingly, the state S201 and the state S202 are merely repeated alternately, and communication between the second stylus 120 and the dual mode controller 330 is not performed.

(E35) when the Second Stylus 120 Having the Second Communication Circuit 122 is Utilized Since the second stylus 120 has the second communication circuit 122 that conforms to the second communication circuit 322 provided in the dual mode controller 330, the second stylus 120 is detected by the second discovery process in the state S202 depicted in FIG. 10. Accordingly, the operating mode of the sensor controller 300 becomes the second mode (IN220), and communication between the second stylus 120 and the dual mode controller 330 is performed using the 2-2nd communication method and the second communication circuit 322.

(E45) when the Dual Mode Stylus 130 Having the Second Communication Circuit 121 is Utilized The dual mode controller 330 detects the dual mode stylus 130 in the first discovery process performed in the state S201 depicted in FIG. 10. Then, in the state S203 after transition, the dual mode controller 330 decides whether or not the second communication method supported by itself and the second communication method supported by the detected dual mode stylus 130 conform to each other. In this case, since the second communication method supported by the dual mode controller 330 is the 2-2nd communication method and the second communication method supported by the dual mode stylus 130 is the 2-1st communication method, a decision result that they do not conform to each other is obtained. Accordingly, the dual mode controller 330 transitions to the state S210 (IN310) and starts operating in the first mode, and communication between the dual mode stylus 130 and the dual mode controller 330 is performed using the first communication method.

(E55) when the Dual Mode Stylus 130 Having the Second Communication Circuit 122 is Utilized The dual mode controller 330 detects the dual mode stylus 130 in the first discovery process performed in the state S201 depicted in FIG. 10. Then, in the state S203 after transition, the dual mode controller 330 decides whether or not the second communication method supported by itself and the second communication method supported by the detected dual mode stylus 130 conform to each other. In this case, since the second communication method is supported by both of them, a decision result that they conform to each other is obtained, and therefore, the dual mode controller 330 further performs the selection process described hereinabove. Consequently, one of the first and second modes is selected.

If a result of the selection is the second mode, then the dual mode controller 330 transitions to the state S220 (IN320) and starts operating in the second mode. Further, the dual mode controller 330 issues an operating mode changing command MCC to the dual mode stylus 130, and also the dual mode stylus 130 receiving this starts operating in the second mode. Accordingly, in this case, communication between the dual mode stylus 130 and the dual mode controller 330 is performed using the 2-2nd communication method and the second communication circuit 321.

On the other hand, if the result of the selection is the first mode, then the dual mode controller 330 transitions to the state S210 (IN310) and starts operating in the first mode. Since the dual mode stylus 130 is originally acting in the first mode, in this case, issuance of an operating mode changing command MCC is unnecessary. Accordingly, in this case, communication between the dual mode stylus 130 and the dual mode controller 330 is performed using the first communication method.

It is to be noted that, while FIG. 10 indicates an example in which the second communication method is used in the cases corresponding to the fields E44 and E55, in those cases, also it is possible to use an expansion mode in place of the second communication method as described hereinabove with reference to FIG. 12B. In this case, the dual mode stylus 130 and the dual mode controller 330 can select whether both of them are to maintain operating based on the first communication method or cooperatively utilizes the expansion mode.

FIG. 13 is a table of communication methods between styluses 100 and sensor controllers 300 determined by a discovery process and a mode determination process depicted in FIG. 12B. This table is different from the table depicted in FIG. 10 in that the fields E44 and E55 are fields E44B and E55B, respectively, and in the fields E44B and E55B, the first communication method or an expansion mode obtained by expanding the first communication method can be utilized.

As described above, with the communication method between a stylus 100 and a sensor controller 300 according to the present embodiment, discovery of detecting a type of the stylus 100 and a mode determination process based on a result of the discovery make it possible to select a communication method among a plurality of communication methods while also an expansion function of the stylus 100 utilized from before is taken advantage of if this is usable in response to respective types of the stylus 100 and the sensor controller.

Consequently, for example, where a stylus has a function for transmitting expansion information such as tilt information, which is not supported by the first mode in which information of the writing pressure or the like is transmitted, the dual mode controller can perform a mode change synchronized with the dual stylus such as to make preparations for reception of the expansion information and issue a command for causing the dual mode stylus to transmit the expansion information.

<State Transition of Dual Mode Stylus 130 in Fields E42 and E53 of FIG. 11>

If the sensor controller 300 is not the dual mode controller 330 but the second sensor controller 320 that performs only for the second communication method, the sensor controller 300 cannot transmit an operating mode changing command MCC (first control signal C1_U (search signal DS)) by the first communication method to the dual mode stylus 130. Accordingly, as described hereinabove, in cases corresponding to the fields E42 and E53 of FIG. 11, it is necessary to devise means other than the operating mode changing command MCC for causing the dual mode stylus 130 to transition to the second mode. This is described in detail below.

Figure 14:
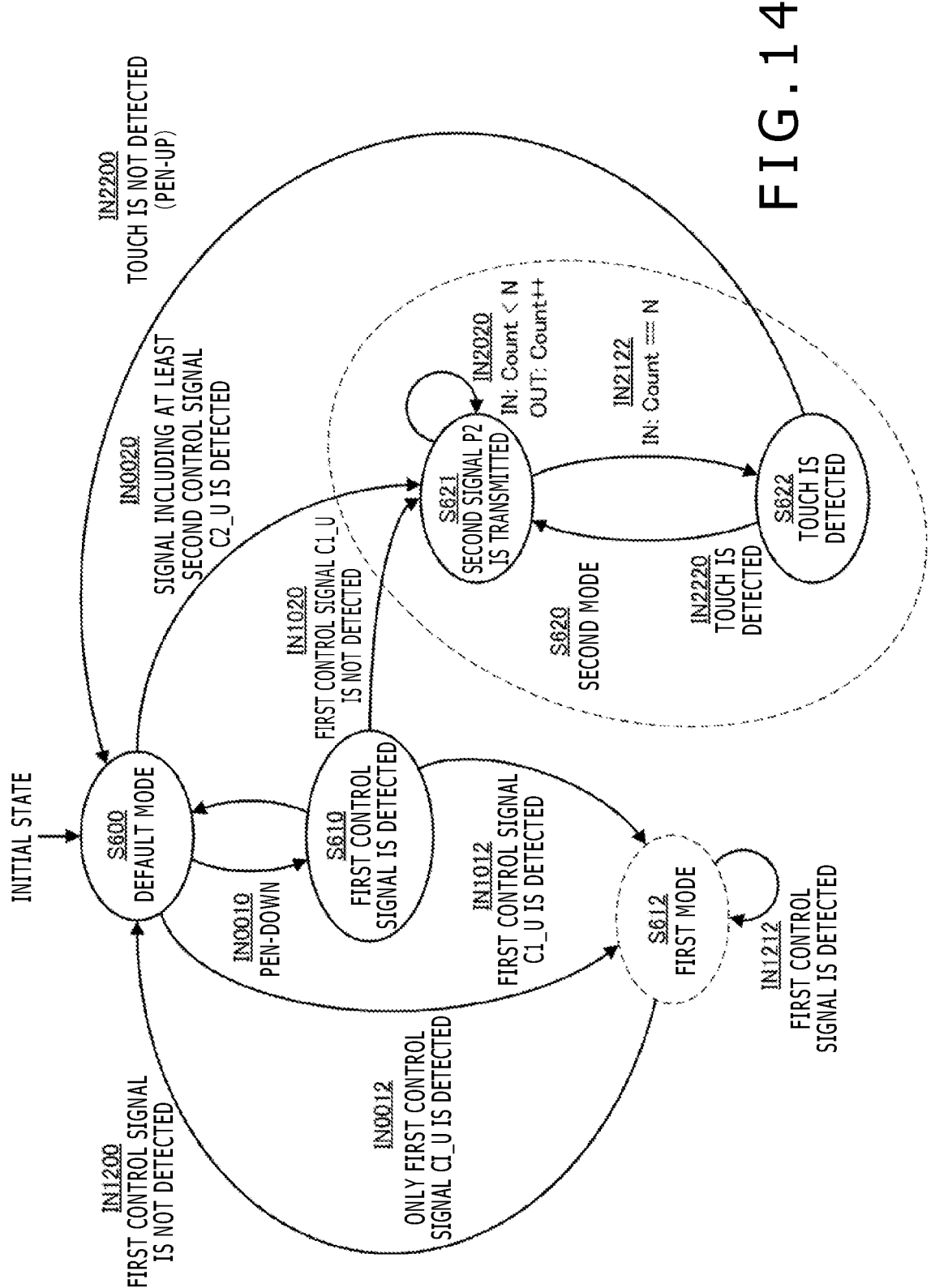
FIG. 14 is a state transition diagram of the dual mode stylus 130, according to one or more embodiments of the present disclosure.

FIG. 14 is a state transition diagram of the dual mode stylus 130 according to the present embodiment. This state transition is executed by the mode controlling circuit 140 depicted in FIG. 9C.

The initial state of the dual mode stylus 130 (after the power supply is turned ON, after communication with the sensor controller 300 has been connected for a fixed period of time or in a like case) is a default mode indicated by a state S600 of FIG. 14.

<Default Mode>

The default mode is a mode corresponding to the discovery phases illustrated in FIGS. 10, 12A, and 12B. The dual mode stylus 130 repeats, in parallel or alternately, a process for detecting a first control signal C1_U (search signal DS) sent out from the sensor controller 300 and a process for detecting, in such a case that the second sensor controller 320 can send out a second control signal C2_U toward the stylus 100, the second control signal C2_U.

If, in the state S600, the dual mode stylus 130 detects only a first control signal C1_U (search signal DS), then the dual mode stylus 130 transitions to a state (S612) in which it operates in the first mode (IN0012).

On the other hand, if, in the state S600, the dual mode stylus 130 detects a signal including at least a second control signal C2_U, then the dual mode stylus 130 transitions to a state (S620) in which it operates in the second mode (IN0020).

<Process after Pen-Down>

If a pen-down operation is detected in the state S600, then the dual mode stylus 130 transitions to a state S610 (IN0010). This detection of a pen-down operation may be performed, for example, by detection of a writing pressure by a writing pressure detection circuit provided in the dual mode stylus 130.

The state S610 is a process when the operating mode of the dual mode stylus 130 is not determined as yet although a pen-down operation is started already. Since it is necessary to determine an operating mode as soon as possible, the dual mode stylus 130 that is in the state S610 performs a process for compulsorily determining which one of the first communication method and the second communication method is to be used to carry out sending out of a signal.

In particular, first, if a first control signal C1_U (search signal DS) is detected, then the dual mode stylus 130 transitions to operating in the first mode of a state S612 (IN1012). In the state S612, the operating in the first mode is continued as long as communication in the first mode is maintained like a case in which the first control signal is detected in a predetermined cycle (IN1212). It is to be noted that, when a second control signal C2_U is detected in addition to a first control signal C1_U (search signal DS), the dual mode stylus 130 can arbitrarily select whether operating in the second mode is to be selected or whether operating in the first mode is to be selected.

On the other hand, if a first control signal C1_U (search signal DS) is not detected in the state S610, then the dual mode stylus 130 transitions to a state S620 irrespective of whether or not a second control signal C2_U is detected (IN1020) and switches its own operation to operating in the second mode. By this process, also where the sensor controller 300 cannot send out a second control signal C2_U (action mode changing command MCC), the dual mode stylus 130 can autonomously switch its own mode to the second mode in which bidirectional communication is not performed.

<Action in Second Mode>

In the second mode in the state S620, the dual mode stylus 130 repeats transmission of a second pen signal P2 based on the second communication method (state S621) by a predetermined number of times (while the Count value does not exceed N) (IN2020).

After the dual mode stylus 130 repeats the transmission process of the second pen signal P2 by the predetermined number of times (IN2122), the dual mode stylus 130 detects whether or not the dual mode stylus 130 itself is in touch with a panel (sensor face) of the electronic apparatus 3 (state S622). For example, in such a case that the sensor controller 300 can send out a second control signal C2_U, the dual mode stylus 130 can perform the detection process in the state S622 by a decision of whether or not the second control signal C2_U is received. On the other hand, also in the case in which the sensor controller 300 cannot send out a second control signal C2_U, by detecting that writing pressure detection is not performed for a fixed period of time by the writing pressure detection circuit provided in the inside of the dual mode stylus 130, it can be decided that the dual mode stylus 130 is changed from the touching state to a non-touching state (pen-up state).

If it is detected that the dual mode stylus 130 is in touch with the panel in the state S622, then the dual mode stylus 130 continues the sending out of the second pen signal P2 in the state S621 (IN2220). On the other hand, if it is detected that the dual mode stylus 130 is not in contact with the panel in a state S622 (if it is detected that the dual mode stylus 130 is spaced away from the panel), then the dual mode stylus 130 returns to the default mode in the state S600 (IN2200).

In this manner, with the state transition method of the dual mode stylus 130 according to the present embodiment, if a first control signal is not detected after detection of a pen-down operation, then the dual mode stylus 130 can switch to the second mode S620 immediately irrespective of whether or not a second control signal C2_U is received. Consequently, even if the sensor controller 300 cannot execute uplink communication in a direction from the sensor controller 300 to the stylus 100, the dual mode stylus 130 does not perform such an operating as to continue performance of dual mode discovery process but can immediately switch to operating in the second mode.

DESCRIPTION OF REFERENCE SYMBOLS

1 Communication system
3 Electronic apparatus
40 Election circuit
41x, 41y Conductor selection circuit
44x, 44y, 62, 133, 333 Switch
49 Detection circuit
50 Reception circuit
51 Amplification circuit
52 Detection circuit
53 AD converter
60 Transmission circuit
61 Search signal supply circuit
63 Direct spread circuit
64 Spread code retention circuit 65 Transmission guard circuit
70 Logic circuit
100 Stylus
101 Electrode
110 First stylus
111, 311 First communication circuit
120 Second stylus
121, 122, 321, 322 Second communication circuit
130 Dual mode stylus
140 Mode controlling circuit
200 Sensor controller
201 Sensor
201X, 201Y Linear electrode
202 Antenna
300 Sensor controller
310 First sensor controller
320 Second sensor controller
330 Dual mode controller
340 to 343 Control circuit
350 Host processor
351 Electronic apparatus controlling circuit
ACK Response signal
DP Detection bit pattern
C1_U First control signal (search signal DS)
C2_U Second control signal (direction from sensor controller to sensor)
CMD Control command
ctrl_r, ctrl_t1 to ctrl_t4 Control signal
Data Data signal
DS Search signal
FD Function information
MCC Action mode changing command
P1 First pen signal
P2 Second pen signal
Pos Position signal
selX, selY, sTRx, sTRy Control signal
SMC Stylus mode switching signal
TCMC Sensor controller switching signal

The invention claimed is:

1. A communication method in a system including a first stylus that operates in a first mode in which bidirectional communication is performed or a second stylus that operates in a second mode in which bidirectional communication or unidirectional communication is performed, and a dual mode controller connected to a sensor that capacitively couples to the first stylus or the second stylus, wherein communication between the first stylus or the second stylus and the dual mode controller is performed by changing an electric field between the first stylus or the second stylus and the sensor, the communication method comprising:
performing, by the dual mode controller, a dual mode discovery process in which a first discovery process and a second discovery process are alternately performed,
the first discovery process including: transmitting, by the dual mode controller, a search signal for detecting the first stylus, performing processing to detect, by the dual mode controller, a response signal transmitted by the first stylus in response to the search signal, and extracting from the response signal, by the dual mode controller, function information that describes a function of the first stylus, and
the second discovery process including: performing processing to detect a signal transmitted by the second stylus;
determining, by the dual mode controller, that a mode of the dual mode controller is the first mode in response to detecting the response signal transmitted by the first stylus in response to the search signal;
determining, by the dual mode controller, that the mode of the dual mode controller is the second mode in response to detecting the signal transmitted by the second stylus while the second discovery process is being performed;
receiving, by the dual mode controller operating in the determined mode, a signal transmitted from one of the first stylus and the second stylus; and
while the dual mode controller is operating in the second mode, supporting, by the dual mode controller, the function of the first stylus based on the function information and determining an operating mode of the dual mode controller based on the function information.

2. The communication method according to claim 1, wherein:
the performing of the dual mode discovery process includes transmitting, by the dual mode controller, the search signal cyclically according to a transmission cycle,
the performing of the first discovery process includes transmitting, by the dual mode controller, the search signal during a first period of time, and performing processing to detect, by the dual mode controller, the response signal during a second period of time,
the performing of the first discovery process includes performing the first discovery process for a total time period including at least the first period of time and the second period of time, and
the performing of the second discovery process includes performing processing to detect, by the dual mode controller, the signal transmitted by the second stylus within a portion of a remaining period of time that is equal to the transmission cycle of the search signal minus the total time period used to perform the first discovery process.

3. The communication method according to claim 2, wherein the total time period includes a guard time period that is between the first period of time and the second period of time.

4. The communication method according to claim 2, further comprising:
receiving a signal transmitted from the first stylus during the remaining time period while the dual mode controller operates in the first mode.

5. The communication method according to claim 4, wherein, while the dual mode controller operates in the first mode, the dual mode controller performs only the first discovery process and does not perform the second discovery process.

6. The communication method according to claim 2, further comprising:
when a dual mode stylus that operates in both of the first and second modes communicates with the dual mode controller that is operating in the first mode, continuing operation of the dual mode stylus in the first mode.

7. The communication method according to claim 1, wherein:
the supporting of the function of the first stylus includes acquiring, by the dual mode controller, one or more pieces of expansion information relating to the first stylus, and
the communication method comprises:

determining, by the dual mode controller, whether the function of the first stylus described in the function information conforms to a function of the dual mode controller, and in response to determining that the function of the first stylus described in the function information conforms to the function of the dual mode controller, transmitting, by the dual mode controller, a command that instructs the first stylus to transmit the one or more pieces of expansion information.

8. The communication method according to claim 7, wherein:

the command designates a timing at which the one or more pieces of expansion information is to be transmitted, and the communication method further includes receiving, by the dual mode controller, the one or more pieces of expansion information transmitted at the timing from the first stylus.

9. The communication method according to claim 8, wherein the one or more pieces of expansion information include a flag that indicates whether it is possible for the first stylus to transmit tilt information indicative of an inclination of the first stylus or twist information indicative of an amount of rotation of the first stylus.

* * * * *